United States Patent
Zhu et al.

(10) Patent No.: US 12,382,533 B2
(45) Date of Patent: Aug. 5, 2025

(54) METHOD FOR CONTROLLING WIRELESS BACKHAUL LINK AND APPARATUS

(71) Applicant: HUAWEI TECHNOLOGIES CO., LTD., Guangdong (CN)

(72) Inventors: Yuanping Zhu, Shanghai (CN); Mingzeng Dai, Shenzhen (CN); Jing Liu, Shanghai (CN); Zhenzhen Cao, Beijing (CN); Yibin Zhuo, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 93 days.

(21) Appl. No.: 17/400,832

(22) Filed: Aug. 12, 2021

(65) Prior Publication Data

US 2021/0378044 A1     Dec. 2, 2021

Related U.S. Application Data

(63) Continuation of application No. PCT/CN2020/074919, filed on Feb. 12, 2020.

(30) Foreign Application Priority Data

Feb. 15, 2019   (CN) .......................... 201910118065.9

(51) Int. Cl.
*H04W 76/25* (2018.01)
*H04B 7/155* (2006.01)
(Continued)

(52) U.S. Cl.
CPC ........ *H04W 76/25* (2018.02); *H04B 7/15528* (2013.01); *H04W 72/20* (2023.01); *H04W 92/16* (2013.01)

(58) Field of Classification Search
None
See application file for complete search history.

(56) References Cited

U.S. PATENT DOCUMENTS 8,514,756 B1 *   8/2013   Ramachandra ..... H04L 61/5069
                                              370/310
9,930,634 B1 *   3/2018   Sevindik ................. H04W 4/02
(Continued)

FOREIGN PATENT DOCUMENTS

CA   3067279 A1 * 12/2018 ........... G06F 15/163
CN   1846420 A  * 10/2006 ....... H04L 29/06027
(Continued)

OTHER PUBLICATIONS

ZTE. "Discussion on backhaul bearer setup in IAB network." Nov. 12, 2018, Spokane, USA, R2-1817411.*
(Continued)

*Primary Examiner* — Andrew C Oh
(74) *Attorney, Agent, or Firm* — Fish & Richardson P.C.

(57) ABSTRACT

The present disclosure relates to methods and apparatus for controlling wireless backhaul link. In one example method, a first device determines to manage a first radio link control (RLC) bearer on a wireless backhaul link between a first backhaul node and a second device, where the second device is a parent node of the first backhaul node, the first device is a centralized unit (CU) of a donor base station, and the second device is a distributed unit (DU) of the donor base station; the second device is a second backhaul node, and the first device is a donor base station; or the first device is a CU of a donor base station, and the second device is a second backhaul node. The first device sends a backhaul type indicator and management information of the first RLC bearer to the first backhaul node.

14 Claims, 20 Drawing Sheets

(51) Int. Cl.
*H04W 72/20* (2023.01)
*H04W 92/16* (2009.01)

(56) References Cited

U.S. PATENT DOCUMENTS

| | | | | |
|---|---|---|---|---|
| 10,470,136 | B1* | 11/2019 | Ghosh | H04W 56/001 |
| 10,869,353 | B2* | 12/2020 | Byun | H04W 76/25 |
| 12,101,791 | B2* | 9/2024 | Wu | H04W 76/34 |
| 2006/0183475 | A1* | 8/2006 | Willey | H04W 64/00 455/435.1 |
| 2010/0260096 | A1* | 10/2010 | Ulupinar | H04B 7/2606 370/315 |
| 2011/0044249 | A1* | 2/2011 | Wu | H04W 76/11 370/328 |
| 2014/0160940 | A1* | 6/2014 | Maehara | H04W 36/0069 370/237 |
| 2014/0169299 | A1* | 6/2014 | Wang | H04L 5/0096 370/329 |
| 2014/0219248 | A1* | 8/2014 | Reddiboyana | H04W 76/15 370/331 |
| 2017/0064731 | A1 | 3/2017 | Wang et al. | |
| 2017/0347307 | A1* | 11/2017 | Mehta | H04W 76/15 |
| 2018/0109972 | A1* | 4/2018 | Kim | H04W 72/12 |
| 2018/0295556 | A1* | 10/2018 | Baek | H04W 8/26 |
| 2018/0332516 | A1* | 11/2018 | Oak | H04W 36/0055 |
| 2018/0337846 | A1* | 11/2018 | Lee | H04L 5/0053 |
| 2018/0368205 | A1* | 12/2018 | Park | H04W 76/32 |
| 2018/0376457 | A1* | 12/2018 | Tseng | H04L 1/16 |
| 2019/0053301 | A1* | 2/2019 | Hampel | H04W 84/04 |
| 2019/0053317 | A1* | 2/2019 | Hampel | H04W 76/27 |
| 2019/0159072 | A1* | 5/2019 | Zhu | H04W 28/24 |
| 2019/0159277 | A1* | 5/2019 | Zhu | H04L 45/16 |
| 2019/0215055 | A1* | 7/2019 | Majmundar | H04W 40/22 |
| 2019/0297555 | A1* | 9/2019 | Hampel | H04L 47/58 |
| 2019/0313433 | A1* | 10/2019 | Abedini | H04W 72/0446 |
| 2019/0349036 | A1* | 11/2019 | Wang | H04B 7/15528 |
| 2019/0349079 | A1* | 11/2019 | Novlan | H04B 7/15542 |
| 2019/0387444 | A1* | 12/2019 | Byun | H04W 36/06 |
| 2020/0045548 | A1* | 2/2020 | Dowlatkhah | H04N 21/631 |
| 2020/0267617 | A1* | 8/2020 | Larsen | H04W 36/304 |
| 2020/0413457 | A1* | 12/2020 | Hong | H04W 76/10 |
| 2021/0014768 | A1* | 1/2021 | Hong | H04W 40/22 |
| 2021/0076368 | A1* | 3/2021 | Malkamäki | H04W 4/20 |
| 2021/0258244 | A1* | 8/2021 | Xu | H04L 45/28 |
| 2021/0409328 | A1* | 12/2021 | Xu | H04L 45/745 |
| 2022/0078674 | A1* | 3/2022 | Wu | H04W 36/26 |
| 2022/0078680 | A1* | 3/2022 | Wu | H04W 36/0064 |

FOREIGN PATENT DOCUMENTS

| | | | | |
|---|---|---|---|---|
| CN | 104685930 | A | | 6/2015 |
| CN | 109257212 | A | | 1/2019 |
| CN | 110351700 | A | * | 10/2019 ............ H04W 40/02 |
| CN | 110351836 | A | * | 10/2019 ............... H04L 5/14 |
| CN | 110475351 | A | * | 11/2019 ......... H04B 7/15528 |
| CN | 110475368 | A | * | 11/2019 ............. H04B 7/022 |
| CN | 110536350 | A | * | 12/2019 ......... H04W 28/0236 |
| CN | 110636561 | A | * | 12/2019 ......... H04W 36/0016 |
| CN | 110636584 | A | * | 12/2019 ......... H04B 7/15528 |
| CN | 110636636 | A | * | 12/2019 ............ H04L 5/0053 |
| CN | 110649997 | A | * | 1/2020 ............ H04L 5/0053 |
| CN | 110662297 | A | * | 1/2020 ......... H04W 72/0406 |
| CN | 110971349 | A | * | 4/2020 ............ H04L 1/1812 |
| CN | 112567796 | A | * | 3/2021 ......... H04W 28/0252 |
| CN | 112740758 | A | * | 4/2021 ......... H04W 36/0061 |
| CN | 112997576 | A | * | 6/2021 ............. H04L 45/74 |
| CN | 113455051 | A | * | 9/2021 ......... H04W 36/0064 |
| CN | 110636555 | B | * | 4/2022 ............ H04L 47/215 |
| CN | 110351700 | B | * | 6/2022 ............ H04W 40/02 |
| EP | 1581014 | A1 | * | 9/2005 ............... H04W 4/06 |
| EP | 1703678 | A1 | * | 9/2006 ............ H04W 60/04 |
| EP | 2409515 | B1 | | 12/2015 |
| JP | 6680797 | B2 | * | 4/2020 ............... H04L 5/00 |
| KR | 20150090213 | A | * | 8/2015 ............ H04W 72/20 |
| WO | WO-2005067325 | A1 | * | 7/2005 ............. H04L 51/38 |
| WO | 2014022769 | A1 | | 2/2014 |
| WO | 2016065645 | A1 | | 5/2016 |
| WO | 2018031170 | A1 | | 2/2018 |
| WO | WO-2018080218 | A1 | * | 5/2018 ............ H04W 68/02 |
| WO | WO-2018164469 | A1 | * | 9/2018 ............ H04W 24/10 |
| WO | WO-2019137285 | A1 | * | 7/2019 ............ H04W 76/11 |
| WO | WO-2019139524 | A1 | * | 7/2019 ......... H04L 12/4633 |
| WO | WO-2019160282 | A1 | * | 8/2019 ............ H04W 40/22 |
| WO | WO-2019184482 | A1 | * | 10/2019 ........ H04W 72/1263 |
| WO | WO-2019192605 | A1 | * | 10/2019 ............ H04L 41/12 |
| WO | WO-2019216717 | A1 | * | 11/2019 ............ H04W 12/06 |
| WO | WO-2020030109 | A1 | * | 2/2020 ......... H04W 36/0011 |
| WO | WO-2020057732 | A1 | * | 3/2020 ......... H04W 36/0058 |
| WO | WO-2020062079 | A1 | * | 4/2020 ............. H04L 45/74 |
| WO | WO-2020095459 | A1 | * | 5/2020 ......... H04B 7/15542 |
| WO | WO-2020108737 | A1 | * | 6/2020 ......... H04B 7/15528 |
| WO | WO-2020164697 | A1 | * | 8/2020 | |

OTHER PUBLICATIONS

Office Action issued in Indian Application No. 202147037312 on Apr. 21, 2022, 7 pages.
ZTE et al., "Discussion on backhaul bearer setup in IAB network," 3GPP TSG-RAN WG2#104, R2-1817411, Spokane, USA, Nov. 12-16, 2018, 6 pages.
ZTE et al., "Discussion on backhaul bearer setup in IAB network," 3GPP TSG-RAN WG3#102, R3-186419, Spokane, USA, Nov. 12-16, 2018, 6 pages.
Office Action in Chinese Application No. 201910118065.9, dated Sep. 2, 2021, 37 pages.
PCT International Search Report and Written Opinion in International Application No. PCT/CN2020/074919, dated Apr. 26, 2020, 13 pages.
3GPP TS 38.331 V15.4.0 (Dec. 2018), "3rd Generation Partnership Project; Technical Specification Group Radio Access Network; NR; Radio Resource Control (RRC) protocol specification (Release 15)," Dec. 2018, 474 pages.
3GPP TS 36.331 V15.4.0 (Dec. 2018), "3rd Generation Partnership Project; Technical Specification Group Radio Access Network; Evolved Universal Terrestrial Radio Access (E-UTRA); Radio Resource Control (RRC); Protocol specification (Release 15),"Dec. 2018, 934 pages.
3GPP TS 38.473 V15.4.1 (Jan. 2019), "3rd Generation Partnership Project; Technical Specification Group Radio Access Network; NG-RAN; F1 application protocol (F1AP)(Release 15)," Jan. 2019, 192 pages.
3GPP TR 38.874 V16.0.0 (Dec. 2018), "3rd Generation Partnership Project; Technical Specification Group Radio Access Network; NR; Study on Integrated Access and Backhaul; (Release 16)," Dec. 2018, 112 pages.
Extended European Search Report issued in European Application No. 20755102.9 on Mar. 3, 2022, 7 pages.

* cited by examiner

METHOD FOR CONTROLLING WIRELESS BACKHAUL LINK AND APPARATUS

CROSS-REFERENCE TO RELATED APPLICATIONS

This application is a continuation of International Application No. PCT/CN2020/074919, filed on Feb. 12, 2020, which claims priority to Chinese Patent Application No. 201910118065.9, filed on Feb. 15, 2019. The aforementioned disclosures are hereby incorporated by reference in their entities.

TECHNICAL FIELD

Embodiments of this application relate to the field of communication technologies, and in particular, to a method for controlling a wireless backhaul link and an apparatus.

BACKGROUND

With development of communication technologies, a relay networking technology is widely used and developed. A relay networking architecture is provided by using the relay networking technology. The relay networking architecture includes a donor base station (e.g. donor gNodeB (DgNB)), one or more relay nodes, and one or more terminals. The relay node is directly connected to the donor base station or indirectly connected to the donor base station through another relay node, and the terminal is connected to the donor base station or the relay node through a radio air interface. In the relay networking architecture, a wireless link between the terminal and the relay node may be referred to as a wireless access link (AL). A wireless link between the relay nodes or between the relay node and the DgNB may be referred to as a wireless backhaul link (BL).

In a 5G-oriented wireless relay networking architecture, both a multi-hop wireless relay scenario and a multi-connectivity scenario can be supported. In a multi-hop/multi-connectivity integrated access and backhaul (IAB) networking scenario, data of a terminal may be usually transmitted, through a wireless access link, to an IAB node accessed by the terminal, so that the IAB node transmits the data to an upper-level node or a donor base station.

When data of a terminal is transmitted on a wireless backhaul link between IAB nodes or between an IAB node and a parent node, the data is mapped to an RLC channel/RLC bearer on the wireless backhaul link for transmission. Different RLC channels/RLC bearers on the wireless backhaul link can provide differentiated quality of service (QoS) assurance. However, the IAB node is not sure when to establish or modify the RLC channel and/or the RLC bearer on the wireless backhaul link. Consequently, a QoS requirement for transmitting the data of the terminal on the wireless backhaul link cannot be ensured.

SUMMARY

Embodiments of this application provide a method for controlling a wireless backhaul link and an apparatus, to improve a QoS requirement for transmitting data of a terminal on a wireless backhaul link.

To achieve the foregoing objective, the embodiments of this application provide the following technical solutions.

According to a first aspect, an embodiment of this application provides a method for controlling a wireless backhaul link. The method includes: A first device determines to manage a first radio link control RLC bearer on a wireless backhaul link between a first backhaul node and a second device, where the second device is a parent node of the first backhaul node. The first device sends a backhaul type indicator and management information of the first RLC bearer to the first backhaul node. The backhaul type indicator is used to indicate that the first RLC bearer is used to transmit data of a terminal. The first device is a centralized unit CU of a donor base station, and the second device is a distributed unit DU of the donor base station. Alternatively, the second device is a second backhaul node, and the first device is a donor base station. Alternatively, the first device is a centralized unit CU of a donor base station, and the second device is a second backhaul node.

This embodiment of this application provides the method for controlling a wireless backhaul link. The first device determines to manage the first RLC hearer on the wireless backhaul link between the first backhaul node and the second device. Then the first device sends the backhaul type indicator and the management information of the first RLC bearer to the first backhaul node. In this way, the first backhaul node can perceive in time that the first RLC bearer that carries the data of the terminal needs to be managed between the first backhaul node and the second device based on the backhaul type indicator, and complete management of the first RLC bearer based on the management information of the first RLC bearer. Therefore, it is ensured that a specified QoS requirement can be met when the data of the terminal is transmitted on the first RLC bearer, thereby implement reliable transmission of the data of the terminal.

In a possible implementation, the method provided in this embodiment of this application further includes: The first device sends the backhaul type indicator and the management information of the first RLC bearer to the second device. In this way, a parent node (for example, the second device) of the first backhaul node can perceive in time that the first RLC bearer needs to be managed, and complete management of the first RLC bearer.

In a possible implementation, the method provided in this embodiment of this application further includes: The first device sends a quality of service parameter of the first RLC bearer to the second device. In this way, when managing the first RLC bearer, the second device enables the data carried on the first RLC bearer to meet a quality of service parameter requirement indicated by the first device.

In a possible implementation, the first device is the centralized unit CU of the donor base station, the second device is the distributed unit DU of the donor base station, and the management information of the first RLC bearer includes: any one or more of description information of a traffic flow that is mapped to the first RLC bearer or an identifier of a radio bearer that is of the terminal and that is mapped to the first RLC bearer, where the description information includes any one or more of the following information at an IP layer that is peered to the CU and the DU: differentiated services code point DSCP information or a flow label flow label. This helps determine that traffic flows of the terminal with a same DSCP value or flow label are transmitted on the first RLC bearer.

In a possible implementation, the method provided in this embodiment of this application further includes: The first device sends, to the first backhaul node, information about the radio bearer that is of the terminal and that is mapped to the first RLC bearer, and/or identification information of a second RLC bearer or an identifier of a logical channel corresponding to a second RLC bearer. The second RLC bearer is an RLC bearer on a wireless backhaul link between the first backhaul node and a third backhaul node. The third backhaul node is a child node of the first backhaul node.

In a possible implementation, that a first device determines to manage a first radio link control RLC bearer on a wireless backhaul link between a first backhaul node and a second device includes: When managing the radio bearer of the terminal, the first device determines to manage the first RLC bearer on the wireless backhaul link between the first backhaul node and the second device.

In a possible implementation, when the first backhaul node accesses the first device, the first device determines to manage the first RLC bearer on the wireless backhaul link between the first backhaul node and the second device.

In a possible implementation, there is also a default radio bearer, between the first backhaul node and the second device, used to transmit traffic of the first backhaul node. The method provided in this embodiment of this application further includes: The first device sends, to the first backhaul node and/or the second device, indication information used to indicate that the first RLC bearer is the default bearer. This helps establish, between the first backhaul node and the second device, the default RLC bearer used for backhaul traffic, and the default RLC bearer may be used to transmit some data of the terminal. For example, when the first backhaul node receives a data packet, but the first backhaul node cannot find a proper mapping rule on the wireless backhaul link, the first backhaul node may map the data packet to the default RLC bearer and send the data packet to a lower-level device.

In a possible implementation, the first RLC bearer is specific to a quality of service parameter requirement of the terminal. After the terminal accesses the first backhaul node, a plurality of RLC bearers used for backhaul traffic may be established. Transmission of traffic of the terminal can be started provided that a radio bearer of an access link is established. This avoids a case in which RLC bearers on segments of the wireless backhaul links are established only when the terminal initiates the traffic. In this way, compared with that a bearer on a wireless backhaul link is established only when the terminal initiates the traffic, a delay can be greatly reduced, and user experience can be improved.

In a possible implementation, the second device is the second backhaul node, and the method provided in this embodiment of this application further includes: The first device sends, to the second device, identification information of a third RLC bearer that is mapped to the first RLC bearer or an identifier of a logical channel corresponding to a third RLC bearer. The third RLC bearer is an RLC bearer on a wireless backhaul link between the second backhaul node and a fourth device, and the fourth device is a parent node of the second backhaul node. The identification information of the third RLC bearer that is mapped to the first RLC bearer or the identifier of the logical channel corresponding to the third RLC bearer is sent to the second device, so that the second device determines a specific first RLC bearer to which data carried on the third RLC bearer is mapped.

In a possible implementation, the method provided in this embodiment of this application further includes: The first device receives, from the second device, an identifier of a logical channel corresponding to the first RLC bearer or identification information of the first RLC bearer. In this way, the first device can determine the identifier allocated by the second device to the first RLC bearer.

In a possible implementation, the method provided in this embodiment of this application further includes: The first device sends, to the first backhaul node, management information used to manage the second RLC bearer.

In a possible implementation, that the first device sends, to the first backhaul node, management information used to manage the second RLC bearer includes: The first device sends, to a first base station, the management information used to manage the second RLC bearer and a first indicator, where the first indicator is used to indicate to send, to the first backhaul node, the management information used to manage the second RLC bearer. The first device is connected to a core network via the first base station.

According to a second aspect, an embodiment of this application provides a method for controlling a wireless backhaul link. The method includes: A first backhaul node receives a backhaul type indicator and management information of a first RLC bearer from a first device. The first backhaul node manages, based on the backhaul type indicator and the management information for performing bearer mapping on the first RLC bearer, the first RLC bearer on a wireless backhaul link between the first backhaul node and a second device. The second device is a parent node of the first backhaul node, and the backhaul type indicator is used to indicate that the first RLC bearer is used to transmit data of a terminal. The first device is a centralized unit CU of a donor base station, and the second device is a distributed unit DU of the donor base station. Alternatively, the second device is a second backhaul node, and the first device is a donor base station. Alternatively, the first device is a centralized unit CU of a donor base station, and the second device is a second backhaul node.

In a possible implementation, the method provided in this embodiment of this application further includes: The first backhaul node receives, from the first device, information about a radio bearer that is of the terminal and that is mapped to the first RLC bearer, and/or identification information of a second RLC bearer or an identifier of a logical channel corresponding to a second RLC bearer. The second RLC bearer is an RLC bearer on a wireless backhaul link between the first backhaul node and a third backhaul node. The third backhaul node is a child node of the first backhaul node.

In a possible implementation, the method provided in this embodiment of this application further includes: The first backhaul node receives, from the first device, indication information used to indicate that the first RLC bearer is a default bearer.

In a possible implementation, the first RLC bearer is specific to a quality of service parameter requirement of the terminal. In other words, the method provided in this embodiment of this application further includes: The first backhaul node receives, from the first device, indication information used to indicate that the first RLC bearer is a dedicated bearer. The indication information of the dedicated bearer is used to indicate that the first RLC bearer is specific to the quality of service parameter requirement of the terminal.

According to a third aspect, an embodiment of this application provides a method for controlling a wireless backhaul link. The method includes: A second device receives, from a first device, a backhaul type indicator and management information of a first RLC bearer. The second device manages, based on the backhaul type indicator and the management information of the first RLC bearer, the first RLC bearer on a wireless backhaul link between the second device and a first backhaul node. The backhaul type indicator is used to indicate that the first RLC bearer is used to transmit data of a terminal, and the second device is a lower-level device of the first backhaul node. The first device is a centralized unit CU of a donor base station, and the second device is a distributed unit DU of the donor base station; or the second device is a second backhaul node, and the first device is a donor base station; or the first device is a CU of a donor base station, and the second device is a second backhaul node.

In an optional implementation, the method provided in this embodiment of this application further includes: The second device receives a quality of service parameter of the first RLC bearer from the first device. In this way, the second device can determine the QoS parameter for managing the first RLC bearer.

In a possible implementation, the first device is the CU of the donor base station, the second device is the DU of the donor base station, and the management information of the first RLC bearer includes: any one or more of description information of a traffic flow that is mapped to the first RLC bearer or an identifier of a radio bearer that is of the terminal and that is mapped to the first RLC bearer, where the description information includes any one or more of the following information at an IP layer that is peered to the CU and the DU: differentiated services code point DSCP information or a flow label flow label.

In a possible implementation, the method provided in this embodiment of this application further includes: The second device receives, from the first device, indication information used to indicate that the first RLC bearer is a default bearer.

In a possible implementation, the first RLC bearer is specific to a quality of service parameter requirement of the terminal. In other words, the method provided in this embodiment of this application further includes: The second device receives, from the first device, indication information used to indicate that the first RLC bearer is a dedicated hearer. The indication information of the dedicated bearer is used to indicate that the first RLC bearer is specific to the quality of service parameter requirement of the terminal.

In a possible implementation, the second device is the second backhaul node, and the method provided in this embodiment of this application further includes: The second device receives, from the first device, identification information of a third REC bearer that is mapped to the first RLC bearer or an identifier of a logical channel corresponding to a third RLC bearer. The third RLC bearer is an RLC bearer on a wireless backhaul link between the second backhaul node and a fourth device. The fourth device is a parent node of the second backhaul node.

In a possible implementation, the method provided in this embodiment of this application further includes: The second device sends, to the first device, an identifier of a logical channel corresponding to the first RLC hearer and/or identification information of the first RLC bearer.

According to a fourth aspect, an embodiment of this application provides a communication apparatus. The communication apparatus may be a first device, or may be a chip in the first device. The communication apparatus may include a processing unit and a transceiver unit. When the communication apparatus is the first device, the processing unit may be a processor, and the transceiver unit may be a transceiver. The first device may further include a storage unit, and the storage unit may be a memory. The storage unit is configured to store instructions, and the processing unit executes the instructions stored in the storage unit, so that the first device implements the method for controlling a wireless backhaul link according to any one of the first aspect or the possible implementations of the first aspect. When the communication apparatus is the chip in the first device, the processing unit may be a processor, and the transceiver unit may be a communication interface, for example, an input/output interface, a pin, or a circuit. The processing unit executes instructions stored in a storage unit, so that the first device implements the method for controlling a wireless backhaul link according to any one of the first aspect or the possible implementations of the first aspect. The storage unit may be a storage unit (for example, a register or a cache) in the chip, or may be a storage unit (for example, a read-only memory or a random access memory) that is in the first device and that is located outside the chip.

According to a fifth aspect, an embodiment of this application provides a communication apparatus. The communication apparatus may be a first backhaul node, or may be a chip in the first backhaul node. The communication apparatus may include a processing unit and a transceiver unit. When the communication apparatus is the first backhaul node, the processing unit may be a processor, and the transceiver unit may be a transceiver. The first backhaul node may further include a storage unit, and the storage unit may be a memory. The storage unit is configured to store instructions, and the processing unit executes the instructions stored in the storage unit, so that the first backhaul node implements the method for controlling a wireless backhaul link according to any one of the second aspect or the possible implementations of the second aspect. When the communication apparatus is to chip in the first backhaul node, the processing unit may be a processor, and the transceiver unit may be a communication interface. For example, the communication interface may be an input/output interface, a pin, a circuit, or the like. The processing unit executes instructions stored in a storage unit, so that the first backhaul node implements the method for controlling a wireless backhaul link according to any one of the second aspect or the possible implementations of the second aspect. The storage unit may be a storage unit (for example, a register or a cache) in the chip, or may be a storage unit (for example, a read-only memory or a random access memory) that is in the first backhaul node and that is located outside the chip.

According to a sixth aspect, an embodiment of this application provides a communication apparatus. The communication apparatus may be a second device, or may be a chip in the second device. The communication apparatus may include a processing unit and a transceiver unit. When the communication apparatus is the second device, the processing unit may be a processor, and the transceiver unit may be a transceiver. The second device may further include a storage unit, and the storage unit may be a memory. The storage unit is configured to store instructions, and the processing unit executes the instructions stored in the storage unit, so that the second device implements the method for controlling a wireless backhaul link according to any one of the third aspect or the possible implementations of the third aspect. When the communication apparatus is the chip in the second device, the processing unit may be a processor, and the transceiver unit may be a communication interface. For example, the communication interface may be an input/output interface, a pin, a circuit, or the like. The processing unit executes instructions stored in a storage unit, so that the second device implements the method for controlling a wireless backhaul link according to any one of the third aspect or the possible implementations of the third aspect. The storage unit may be a storage unit (for example, a register or a cache) in the chip, or may be a storage unit (for example, a read-only memory or a random access memory) that is in the second device and that is located outside the chip.

According to a seventh aspect, an embodiment of this application provides a computer-readable storage medium. The computer-readable storage medium stores a computer program or instructions. When the computer program is run or the instructions are run on a computer, the computer is enabled to perform the method for controlling a wireless backhaul link according to any one of the first aspect and the possible implementations of the first aspect.

According to an eighth aspect, an embodiment of this application provides a computer-readable storage medium. The computer-readable storage medium stores a computer program or instructions. When the computer program is run or the instructions are run on a computer, the computer is enabled to perform the method for controlling a wireless backhaul link according to any one of the second aspect and the possible implementations of the second aspect.

According to a ninth aspect, an embodiment of this application provides a computer-readable storage medium. The computer-readable storage medium stores a computer program or instructions. When the computer program is run or the instructions are run on a computer, the computer is enabled to perform the method for controlling a wireless backhaul link according to any one of the third aspect and the possible implementations of the third aspect.

According to a tenth aspect, an embodiment of this application provides a computer program product including instructions. When the instructions are run on a computer, the computer is enabled to perform the method for controlling a wireless backhaul link according to any one of the first aspect and the possible implementations of the first aspect.

According to an eleventh aspect, an embodiment of this application provides a computer program product including instructions. When the instructions are run on a computer, the computer is enabled to perform the method for controlling a wireless backhaul link according to any one of the second aspect and the possible implementations of the second aspect.

According to a twelfth aspect, an embodiment of this application provides a computer program product including instructions. When the instructions are run on a computer, the computer is enabled to perform the method for controlling a wireless backhaul link according to any one of the third aspect and the possible implementations of the third aspect.

According to a thirteenth aspect, an embodiment of this application provides a communication system. The communication system includes any one or more of the following: the first device described in the fourth aspect and the possible implementations of the fourth aspect, and the first backhaul node described in the fifth aspect and the possible implementations of the fifth aspect. Optionally, the communication system may further include the second device described in the sixth aspect and the possible implementations of the sixth aspect, in an optional implementation, the communication system may further include a terminal. The terminal accesses the communication system via a third backhaul node.

In an optional implementation, when the second device is not a donor node, the communication system may further include a donor node.

According to a fourteenth aspect, an embodiment of this application provides a communication apparatus. The communication apparatus includes a processor and a storage medium, and the storage medium stores instructions. When the instructions are run by the processor, the method for controlling a wireless backhaul link according to any one of the first aspect or the possible implementations of the first aspect is implemented.

According to a fifteenth aspect, an embodiment of this application provides a communication apparatus. The communication apparatus includes a processor and a storage medium, and the storage medium stores instructions. When the instructions are run by the processor, the method for controlling a wireless backhaul link according to any one of the second aspect or the possible implementations of the second aspect is implemented.

According to a sixteenth aspect, an embodiment of this application provides a communication apparatus. The communication apparatus includes a processor and a storage medium, and the storage medium stores instructions. When the instructions are run by the processor, the method for controlling a wireless backhaul link according to any one of the third aspect or the possible implementations of the third aspect is implemented.

According to a seventeenth aspect, an embodiment of this application provides a communication apparatus. The communication apparatus includes one or more modules, configured to implement the methods in the first aspect, the second aspect, and the third aspect; and the one or more modules may correspond to the steps in the methods in the first aspect, the second aspect, and the third aspect.

According to an eighteenth aspect, an embodiment of this application provides a communication apparatus, including a processor, where the processor is coupled to a memory-, the memory is configured to store a computer program or instructions, and the processor is configured to execute the computer program or the instructions in the memory, so that the communication apparatus performs the communication method described in any one of the first aspect, the second aspect, or the third aspect.

In an optional implementation, the communication apparatus in this embodiment of this application may further include a transceiver and a memory. The memory is configured to store the computer program or the instructions.

It should be understood that, when the communication apparatus described in the eighteenth aspect corresponds to the first aspect and the possible implementations of the first aspect, the communication apparatus may be a first device, or an apparatus used in the first device. For example, the apparatus used in the first device may be a chip, a chip system, or a circuit system. When the communication apparatus described in the eighteenth aspect corresponds to the second aspect and the possible implementations of the second aspect, the communication apparatus may be a first backhaul node, or an apparatus used in the first backhaul node. For example, the apparatus used in the first backhaul node may be a chip, a chip system, or a circuit system. When the communication apparatus described in the eighteenth aspect corresponds to the third aspect and the possible implementations of the third aspect, the communication apparatus may be a second device, or an apparatus used in the second device. Fax example, the apparatus used in the second device may be a chip, a chip system, or a circuit system.

Any apparatus, computer storage medium, computer program product, chip, or communication system provided above is configured to perform the corresponding method provided above. Therefore, for beneficial effects that can be achieved by the apparatus, computer storage medium, computer program product, chip, or communication system, refer to beneficial effects of a corresponding solution in the corresponding method provided above. Details are not described herein again.

BRIEF DESCRIPTION OF DRAWINGS

FIG. 7 to FIG. 11A and FIG. 11B each are a schematic diagram of a method for controlling a wireless backhaul link according to an embodiment of this application;

DESCRIPTION OF EMBODIMENTS

Figure 1:
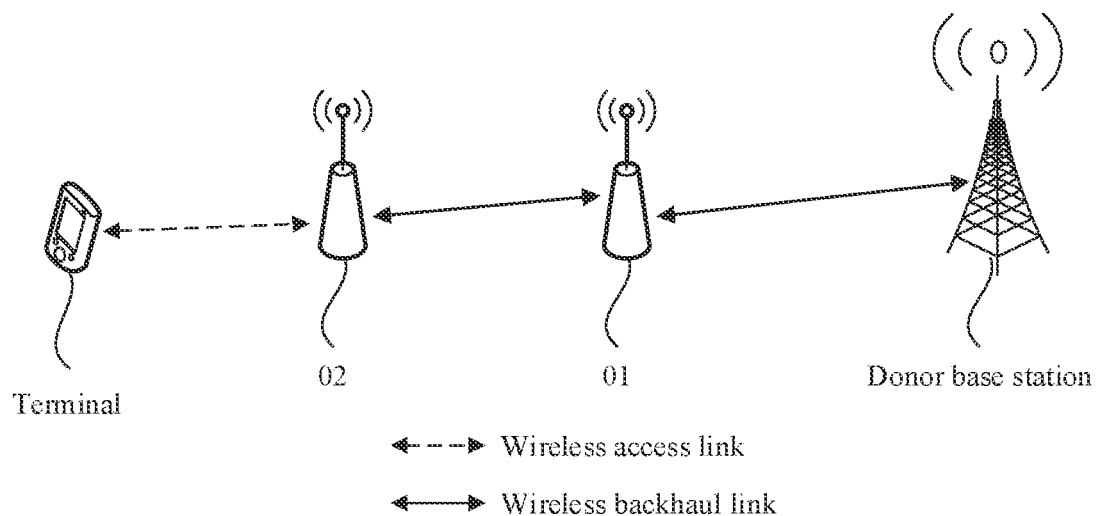
FIG. 1 is a schematic structural diagram 1 of a wireless backhaul communication system according to an embodiment of this application.

To clearly describe technical solutions in embodiments of this application, terms such as "first" and "second" are used in the embodiments of this application to distinguish between same items or similar items that have basically same functions and purposes. For example, a first RLC bearer and a second RLC bearer are merely intended to distinguish between different RLC bearers, and do not limit a sequence of the first RLC bearer and the second RLC bearer. A person skilled in the art may understand that the terms such as "first" and "second" do not limit a quantity and an execution sequence, and the terms such as "first" and "second" do not indicate a definite difference.

It should be noted that in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" is intended to present a related concept in a specific manner.

In this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. The character "/" generally indicates an "or" relationship between the associated objects. The term "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

The following describes the technical solutions in this application with reference to the accompanying drawings.

It should be understood that names of all nodes and messages in this application are merely names specified for ease of description in this application, and may be different names in an actual network. It should not be understood that names of various nodes and messages are limited in this application. On the contrary, any name that has a function that is the same as or similar to that of a node or a message used in this application is considered as a method or an equivalent replacement in this application, and falls within the protection scope of this application. Details are not described below.

Compared with a 4th generation mobile communication system, a 5th generation (5G) mobile communication system has stricter requirements on various network performance indicators in an all-round manner. For example, a capacity indicator is increased by 1000 times, wider coverage is required, and ultra-high reliability and an ultra-low latency are required. On the one hand, because of abundant frequency resources on high-frequency carriers, high-frequency small cell networking is increasingly popular in hotspot areas to meet an ultra-high capacity requirement of 5G. The high-frequency carrier has a relatively poor propagation characteristic, is severely attenuated due to blocking, and has a small coverage area. Therefore, a large quantity of small cells need to be densely deployed. Correspondingly, it is costly and difficult to provide fiber backhaul for these densely deployed small cells. Therefore, an economical and convenient backhaul solution is required. On the other hand, to meet a wide coverage requirement, it is difficult and costly to deploy optical fibers to provide network coverage in some remote areas. Therefore, a flexible and convenient solution for access and backhaul also needs to be designed.

To further reduce deployment costs and improve deployment flexibility, an integrated access and backhaul (IAB) technology is introduced in 5G. A wireless transmission solution is used for both an access link (AL) and a backhaul link (BL), so that optical fiber deployment can be avoided.

In the embodiments of this application, a node that supports integrated access and backhaul may be referred to as a wireless backhaul node, and the wireless backhaul node is configured to provide wireless backhaul traffic for a node (for example, a terminal) that accesses the wireless backhaul node wirelessly. The wireless backhaul traffic refers to data and/or signaling backhaul traffic provided through a wireless backhaul link. The wireless backhaul node may also be referred to as a relay node (RN) or an IAB node. For ease of description, the IAB node is used as an example for description below. The IAB node may provide wireless access traffic for a terminal, and uplink data (including, for example, uplink user plane data and uplink control plane signaling) of the terminal is transmitted to the IAB node through a wireless access link. Then, the IAB node is connected to a donor node through the wireless backhaul link for transmission. Downlink data (including downlink user plane data and downlink control plane signaling) of the terminal is sent by the donor node to the IAB node through the wireless backhaul link, and then is transmitted by the IAB node to the terminal through the wireless access link. The donor node is also referred to as an IAB donor, a donor node, or a donor base station. The following embodiment is described by using the donor base station as an example. In a 4G network, the donor base station may be a donor eNodeB (DeNB). In a 5G network, the donor base station may be a donor gNodeB (DgNB).

For example, the donor base station may be an access network element having a complete base station function, or may be an access network element in a form in which a centralized unit (CU) is separated from a distributed unit (DU). The donor base station is connected, through a wireless link or a wired link, to a core network element that serves the terminal, for example, is connected to a network element in a 5G core (5GC) network or a 4G core network, and provides backhaul traffic for an IAB node. One IAB node may include a function of a DU and a function of a mobile terminal (MT). The function of the MT mainly refers to a function similar to that of a mobile terminal, and is terminated at a radio interface layer of a Uu interface on a backhaul link of an IAB donor or another LAB node. The function of the DU mainly refers to providing an access function for a terminal or a node that is served by the IAB node, that is, a function of the Uu interface. For example, the DU may provide a wireless connection function for the terminal or a lower-level IAB node.

When the IAB node is oriented to a parent node of the IAB node, the IAB node may be considered as a terminal, that is, a role of the MT. When the IAB node is oriented to a child node (where the child node may be another IAB node, or a terminal that accesses the IAB node) of the IAB node, the IAB node may be considered as a network device, that is, a role of the DU. For ease of description, a centralized unit of the donor node is briefly referred to as a donor CU (or directly referred to as a CU), and a distributed unit of the donor node is briefly referred to as a donor DU. The donor CU may alternatively be in a form in which a control plane (CP) is separated from a user plane (UP), for example, the CU may include one CU-CP and one CU-UP (or more CU-UPs).

In a current 5G standard, considering that a high frequency band has a small coverage area, to ensure coverage performance of a network, multi-hop networking may be used in an IAB network. In consideration of a requirement on service transmission reliability, the IAB node may be enabled to support multi-connectivity, to cope with an exception that may occur on a backhaul link, for example, an exception such as link interruption or blockage and load fluctuation, thereby improving transmission reliability. The multi-connectivity may be specifically dual connectivity (DC), or may be at least two connections. This is not limited in the embodiments of this application.

The IAB network supports multi-hop networking and multi-connectivity networking. Therefore, there may be a plurality of transmission paths between a terminal and a donor base station. On one path, there is a determined hierarchical relationship between IAB nodes and between an IAB node and a donor base station that serves the IAB node. In the embodiments of this application, each IAB node considers a node that provides wireless access and backhaul traffic or the IAB node as a parent node. Correspondingly, each IAB node may be considered as a child node of a parent node of the IAB node. In other words, a parent node of one IAB node is a next-hop node of the IAB node on an uplink or a previous-hop node of the IAB node on a downlink, and a child node of one IAB node is a previous-hop node of the IAB node on an uplink or a next-hop node of the IAB node on a downlink. Therefore, in the embodiments of this application, from a perspective of downlink transmission, the parent node of the IAB node is also referred to as an upper-level device/node of the IAB node, and the child node of the IAB node is also referred to as a lower-level device/node of the IAB node.

For example, as shown in FIG. 1, from a perspective of downlink transmission, a parent node of an IAB node 01 is a donor base station. In other words, the IAB node 01 is a child node of the donor base station. A child node of the IAB node 01 is an IAB node 02. In other words, a parent node of the IAB node 02 is the IAB node 01.

For ease of description, basic terms used in this application are defined below.

Wireless access link: The wireless access link is a wireless link used when a terminal communicates with a node (for example, an IAB node, a donor node, a donor base station, or a donor DU) that provides access traffic for the terminal, and includes an uplink transmission link and a downlink transmission link. Uplink transmission on the wireless access link is also referred to as uplink transmission on an access link, and downlink transmission on the wireless access link is also referred to as downlink transmission on an access link. Usually, the wireless access link may bear a radio bearer (RB) of the terminal. The radio bearer of the terminal is a generic term of a series of protocol entities and configurations allocated by the base station to the terminal, and includes a packet data convergence protocol (PDCP) protocol entity, a radio link control (RLC) protocol entity, a media access control (MAC) protocol entity, a series of resources allocated by a physical (PFIY) layer, and the like. The RB is a channel (including PHY, MAC, RLC, and PDCP) that connects a terminal and a wireless backhaul node accessed by the terminal through a Uu interface, and data transmitted on the Uu interface may pass through the RB. The RB includes a signaling radio bearer (SRB) and a data radio bearer (DRB). The SRB is a channel for actual transmission of a system signaling message, and the DRB is a channel for actual transmission of user data.

As shown in FIG. 1, a link between a terminal and the IAB node 02 may be referred to as a wireless access link.

Wireless backhaul link: The wireless backhaul link is a wireless link used when a wireless backhaul node communicates with a parent node of the wireless backhaul node, and includes an uplink transmission link and a downlink transmission link. Uplink transmission on the wireless backhaul link is also referred to as uplink transmission on a backhaul link, and downlink transmission on the wireless backhaul link is also referred to as downlink transmission on a backhaul link. The wireless backhaul node includes but is not limited to the foregoing IAB node.

As shown in FIG. 1, a link between the IAB node 02 and the IAB node 01 may be referred to as a wireless backhaul link. A link between the IAB node 01 and the donor base station may be referred to as a wireless backhaul link.

F1AP message: The F1AP message is a control plane message transmitted over an interface between a CU and a DU. In a possible IAB scenario, the CU is used as a part of a donor base station, and the DU is used as a part of an IAB node. There may be a communication interface between the CU and the DU of the IAB node, that is, an F1 interface (or an F1* interface). The F1 interface includes a user plane and a control plane, and an application protocol layer of the control plane is an F1AP (F1 application Protocol) layer. A control plane message on the F1 interface between the CU and the IAB node is referred to as the F1AP message, and may be used to manage the F1 interface, configure the DU of the IAB node, transmit a radio resource control (RRC) message of a terminal, and the like.

An MT part of the IAB node may access a network in a manner as that of the terminal, and establish a session (e.g. PDU session) with a core network to transmit traffic data of the MT. This type of traffic data originates from or terminates at the MT part of the IAB node. Therefore, this type of traffic data may be referred to as MT access traffic or access traffic of the IAB node. Typical MT access traffic is as follows. For example, the MT may establish a session with the core network to connect to an operation, administration, and maintenance (OAM) network element, and then download a necessary profile required by the IAB node from the OAM. Traffic used by the MT to download the profile from the OAM is the MT access traffic, and the MT access traffic needs to be transmitted on a wireless backhaul link (a backhaul link between an IAB node and a base station or between two IAB nodes).

In this embodiment of this application, on the wireless backhaul link of the IAB node oriented to the parent node, data of the terminal may be considered as backhaul traffic for the IAB node. The terminal may be a terminal that accesses the IAB node, or may be a terminal that accesses a child node of the IAB node, or may be a terminal that accesses a secondary child node of the IAB node (that is, indirectly connected to the IAB node through at least two wireless links and connected to a node of a donor base station through the IAB node). In addition, there is traffic terminated at the DU part of the IAB node, for example, an F1AP message between the IAB-DU and the CU, which may also be considered as backhaul traffic. Therefore, each IAB node needs to transmit both access traffic (e.g. MT access traffic) and backhaul traffic on a wireless backhaul link oriented to a parent node of the IAB node.

Optionally, when an MT part of an IAB node executes MT access traffic, the IAB node or the MT part of the IAB node may also be considered by a parent node (or an upper-level node) as a terminal that accesses the parent node.

It should be noted that the communication system to which the embodiments of this application are applicable includes but is not limited to a narrowband-internet of things (NB-IoT) system, a wireless local area network (WLAN) system, an LTE system, a next-generation 5G mobile communication system, or a communication system after 5G, for example, a new radio (NR) system or a device-to-device (D2D) communication system.

Figure 2:
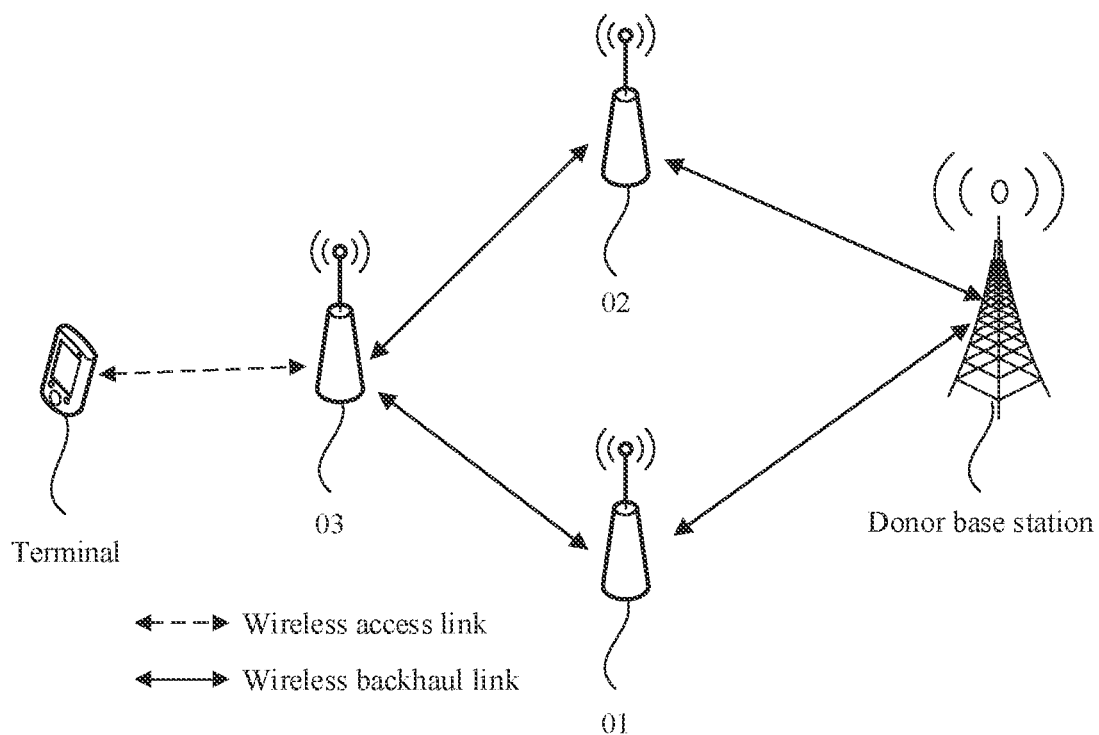
FIG. 2 is a schematic structural diagram 2 of a wireless backhaul communication system according to an embodiment of this application.
Figure 3A:
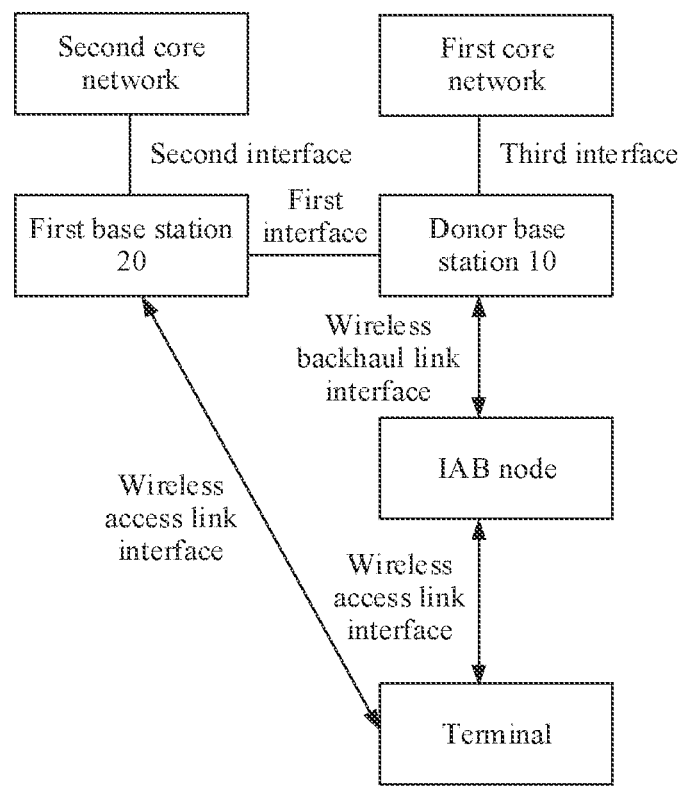
FIG. 3(a) and FIG. 3(b) are an architectural diagram of a wireless backhaul communication system according to an embodiment of this application.
Figure 3B:
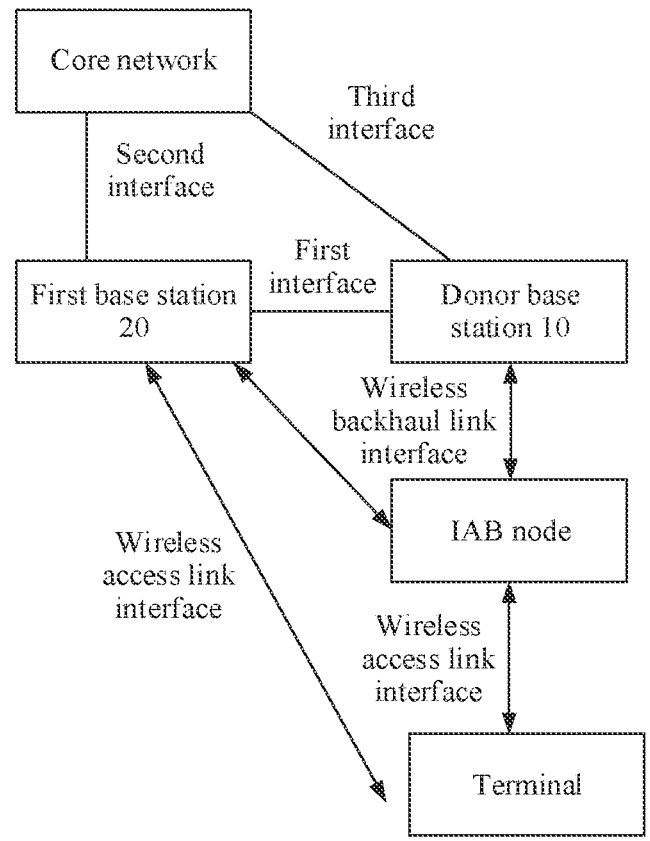

To better understand a data transmission method used in a wireless backhaul network and an apparatus in the embodiments of this application, the following first describes a communication system to which the embodiments of this application are applied. Referring to FIG. 1, FIG. 2, and FIG. 3(a) and FIG. 3(b), FIG. 1 is a schematic diagram of a communication system to which an embodiment of this application is applied, FIG. 2 is a schematic diagram of another communication system to which an embodiment of this application is applied, and FIG. 3(a) and FIG. 3(b) are a schematic diagram of still another communication system to which an embodiment of this application is applied.

As shown in FIG. 1, the communication system shown in FIG. 1 is a wireless backhaul communication system. The wireless backhaul communication system includes a donor base station, an IAB node 01, an IAB node 02, and a terminal served by the IAB node 02.

A parent node of the IAB node 01 is the donor base station. The IAB node 01 is a parent node of the IAB node 02. In this embodiment of this application, the IAB node 01 is also referred to as a previous-hop node (or an upper-level device/node) of the IAB node 02 in a downlink direction. An uplink data packet of the terminal served by the IAB node 02 is transmitted to the donor base station sequentially through the IAB node 02 and the IAB node 01, and then is sent by the donor base station to a core network (the core network is not shown in FIG. 1). A downlink data packet of the terminal served by the IAB node 02 is transmitted to the IAB node 02 sequentially through the donor base station and the IAB node 01, and then is sent by the IAB node 02 to the terminal.

For example, the core network is a 4G core network (for example, an evolved packet core (EPC) network). In this case, the donor base station receives an uplink data packet from the terminal, and transmits the uplink data packet to the EPC. Alternatively, the donor base station receives a downlink data packet from the EPC, and sends the downlink data packet to the terminal sequentially through the IAB node 01 and the IAB node 02.

For example, the core network is a 5G core network. The donor base station sends an uplink data packet to a user plane function (UPF) entity in the 5G network. A downlink data packet is received by the donor base station from the 5G core network, and then sent to the terminal sequentially through the IAB node 01 and the IAB node 02.

It should be understood that in FIG. 1, there is one available path for data transmission between the terminal and the donor base station: the terminal ↔ the IAB node 02 ↔ the IAB node ↔ the donor base station.

As shown in FIG. 2, the communication system shown in HG. 2 is another wireless backhaul communication system. The wireless backhaul communication system includes a donor base station, an IAB node 01, an IAB node 02, an IAB node 03, and a terminal that is served by the IAB node 02 and the IAB node 03. A parent node of the IAB node 01 is the donor base station, and a parent node of the IAB node 02 is the donor base station. The IAB node 01 is a parent node of the IAB node 03. The IAB node 02 is a parent node of the IAB node 03. Therefore, the IAB node 03 has two parent nodes. In other words, the IAB node 03 has two upper-level nodes, and an uplink data packet that needs to be sent through the IAB node 03 may be transmitted to the donor base station through two paths. In this application, the IAB node 01 is also referred to as a first upper-level node of the IAB node 03, and the IAB node 02 is also referred to as a second upper-level node of the IAB node 03. In FIG. 2, there are two available paths for data transmission between the terminal and the donor base station: Path 1: the terminal ↔ the IAB node 03 ↔ the IAB node 01 ↔ the donor base station. Path 2: the terminal ↔ the IAB node 03 ↔ the IAB node 02 ↔ the donor base station.

The wireless backhaul communication systems shown in FIG. 1 and FIG. 2 are merely examples. In an IAB scenario in which multi-hop and multi-connectivity are combined, there are more other possibilities. For example, a donor node and an IAB node connected to another donor node form dual connectivity to serve a terminal. The possibilities are not listed one by one herein.

It should be noted that, in this embodiment of this application, the base station (including the donor base station) and the IAB node may be in a same network standard, or may be in different network standards. For example, both the donor base station and the IAB node are in a 4G network standard or a 5G network standard. As shown in FIG. 3(a) and FIG. 3(b), a donor base station 10 and a first base station 20 form dual connectivity to serve a terminal. FIG. 3(a) and FIG. 3(b) differ from FIG. 1 and FIG. 2 in that: FIG. 1 and FIG. 2 each show standalone (SA, standalone) networking. However, FIG. 3(a) and FIG. 3(b) show a non-standalone (NSA, non-standalone) networking mode. In the SA mode, a core network is a 5G core network (NGC, new generation core), the donor base station 10 is a donor gNB that supports an NR air interface standard, a wireless access link between a terminal and an IAB node uses an NR air interface, and an NR wireless backhaul link is between the IAB node and the donor base station. There are two types of IAB networking in the NSA mode. Referring to FIG. 3(a), a terminal accesses an IAB node through a wireless access link interface in a first network standard. The IAB node is connected to the donor base station 10 through the wireless backhaul link interface in the first network standard. The donor base station 10 is connected to a first core network through an NG interface, and the first core network is a core network that serves the IAB node. The terminal is further connected to the first base station 20 through a Uu interface in a second network standard, the first base station is connected to a second core network through a second interface, and the second core network is a core network that serves the terminal. The first base station 20 is connected to the donor base station 10 through a first interface.

For example, if the second network standard is a 4G network or an LTE network, the first base station is an eNB, and the donor base station is a gNB, the first interface may be an X2 interface. The first base station 20 communicates with the second core network through the second interface. The donor base station 10 communicates with the first core network through a third interface. In this case, the first core network may be a 5GC. The second core network may be an EPC. The second interface is an S1 interface. The third interface is an NO interface. For example, the first network standard may be NR.

In FIG. 3(b), a terminal accesses an IAB node through a wireless access link interface in a first network standard, and the IAB node is connected to the donor base station through the wireless backhaul link interface in the first network standard. There is a first interface between the donor base station and the first base station. The first base station has a user plane connection and a control plane connection to a core network. The first base station is connected to the terminal and the IAB node. A user plane connection exists between the core network and the donor base station 10. The core network in FIG. 3(b) may be an EPC. In this case, the second interface is still an S1 interface. The third interface may be an S1-U.

The IAB node in FIG. 3(a) operates in the SA mode, and is connected to the NGC, through the donor base station, that serves the IAB node. The terminal operates in the NSA mode, and the core network of the terminal is the EPC. A difference between FIG. 3(b) and FIG. 3(a) lies in that the IAB node also operates in the NSA mode, and the core network that serves the IAB node is also the EPC.

It should be noted that in the communication systems shown in FIG. 1 to FIG. 3(a) and FIG. 3(b) in this application, a link between the terminal and the IAB node may be referred to as the wireless access link. A link between the IAB nodes or between the IAB node and the donor base station is referred to as a wireless backhaul link.

It should be understood that the terminal may also be referred to as a terminal device, user equipment (UE), a mobile station (MS), a mobile terminal (MT), or the like. The terminal may be a mobile phone, a tablet computer (e.g. Pad), a computer with a wireless transceiver function, a virtual reality (VR) terminal, an augmented reality (AR) terminal, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

It should be understood that the IAB node, the donor base station, and the terminal may be deployed on land, including an indoor or outdoor node, base station and terminal, a handheld node, base station and terminal, or a vehicle-mounted node, base station and terminal, may be deployed on water, or may be deployed on an airplane, a balloon, and a satellite in the air. Application scenarios of the IAB node, the donor base station, and the terminal are not limited in this embodiment of this application.

It should be understood that the embodiments of this application are applicable to downlink transmission, or applicable to uplink transmission. A signal transmission direction is not limited in the embodiments of this application. Downlink transmission means that the parent node of the IAB node sends downlink data or downlink signaling to the IAB node, or the IAB node sends downlink data or downlink signaling to the terminal. Uplink transmission means that the terminal sends uplink data or uplink signaling to the IAB node, or the IAB node sends uplink data or uplink signaling to the parent node.

It should be understood that a licensed spectrum, an unlicensed spectrum, or both a licensed spectrum and an unlicensed spectrum ma be used for communication between the IAB node and the donor base station, between the IAB nodes, and between the IAB node and the terminal; and a spectrum below 6 gigahertz (GHz), a spectrum above 6 GHz, or both a spectrum below 6 GHz and a spectrum above 6 GHz may be used for communication between the IAB node and the donor base station, between the IAB nodes, and between the IAB node and the terminal. In this application, spectrum resources used between the IAB node and the donor base station, between the IAB nodes, and between the IAB node and the terminal are not limited.

Currently, establishment of a radio air interface radio bearer of a terminal is controlled by a base station. The base station determines, based on a quality of service (QoS) profile related to traffic of the terminal received from a core network, an air interface radio bearer (for example, a DRB or an SRB) that needs to be established with the terminal, and then sends a profile related to the radio bearer to the terminal, so that the terminal completes, based on control of the network side, configurations required for establishing the radio bearer, such as configurations of a PDCP layer, an RLC layer, and a logical channel.

For the MT access traffic of the IAB node, a manner in which the terminal manages a radio bearer (including establishment, modification, deletion, and the like of the radio bearer) may be used.

However, in an IAB network, an RLC bearer (or referred to as a backhaul type RLC bearer) used to transmit the backhaul traffic needs to be established on the wireless backhaul link between the IAB node and the parent node. The radio bearer of the terminal is mapped to the backhaul type RLC bearer for transmission on the wireless backhaul link. When and how the backhaul type RLC bearer of the IAB node is established/modified on the wireless backhaul link are not provided in a conventional technology. In other words, the backhaul type RLC bearer in this embodiment of this application may be used to carry the radio bearer of the terminal. The radio bearer of the terminal is usually used to transmit data of the terminal.

Figure 4:
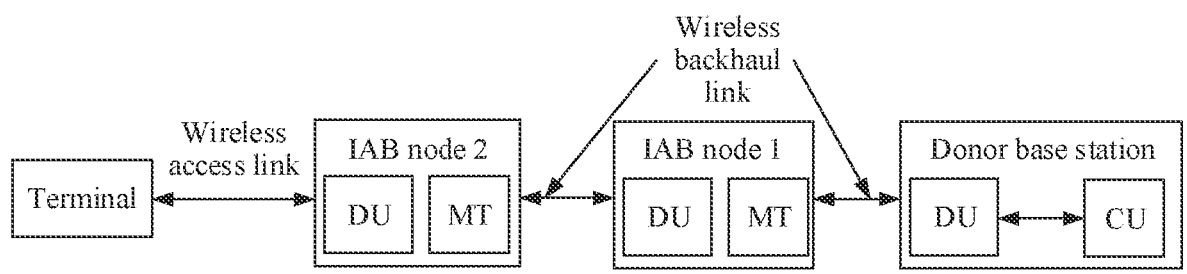
FIG. 4 is a schematic structural diagram of another wireless backhaul communication system according to an embodiment of this application.

As shown in FIG. 4, FIG. 4 is a schematic diagram of a topology of an IAB node. Referring to FIG. 4, in an IAB network, one transmission path between a terminal and a donor node (e.g. IAB donor) may include one or more IAB nodes. Each IAB node needs to maintain a wireless backhaul link oriented to a parent node, and further needs to maintain a wireless link with a child node. Because locations of the IAB nodes in the transmission path are different, there are two types of wireless links between an IAB node and a child node. If the IAB node is a node accessed by the terminal, for example, an IAB node 2 in FIG. 4, there is a wireless access link between the IAB node 2 and the child node (that is, the terminal). If the IAB node is an intermediate backhaul node, for example, an IAB node 1 in FIG. 4, there is a wireless backhaul link between the IAB node 1 and the child node (that is, the IAB node 2).

It should be understood that, if the donor base station includes a distributed unit DU and a centralized unit CU, and the IAB node includes an MT and a DU, the wireless access link may be a link between the terminal and the DU (including a donor DU and a DU of the IAB node), and the wireless backhaul link may be a link between the IAB node (for example, the MT of the IAB node) and a parent node (for example, a DU of the parent node) of the IAB node.

Figure 5A:
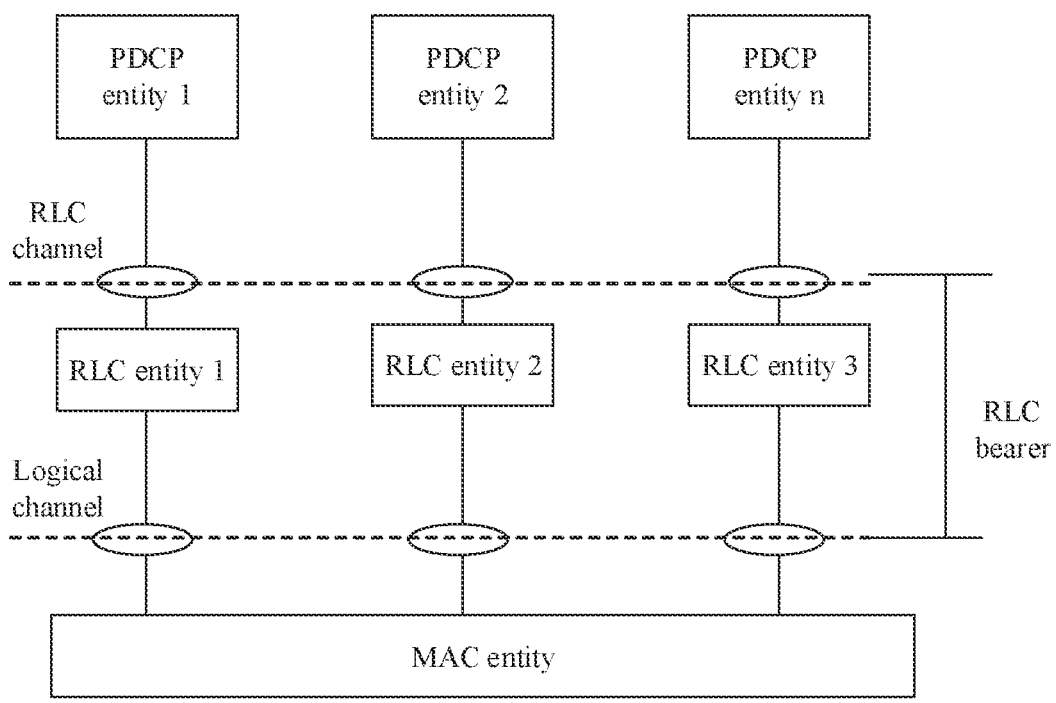
FIG. 5(a), FIG. 5(b), and FIG. 5(c) are a schematic diagram of an RLC bearer according to an embodiment of this application.
Figure 5B:
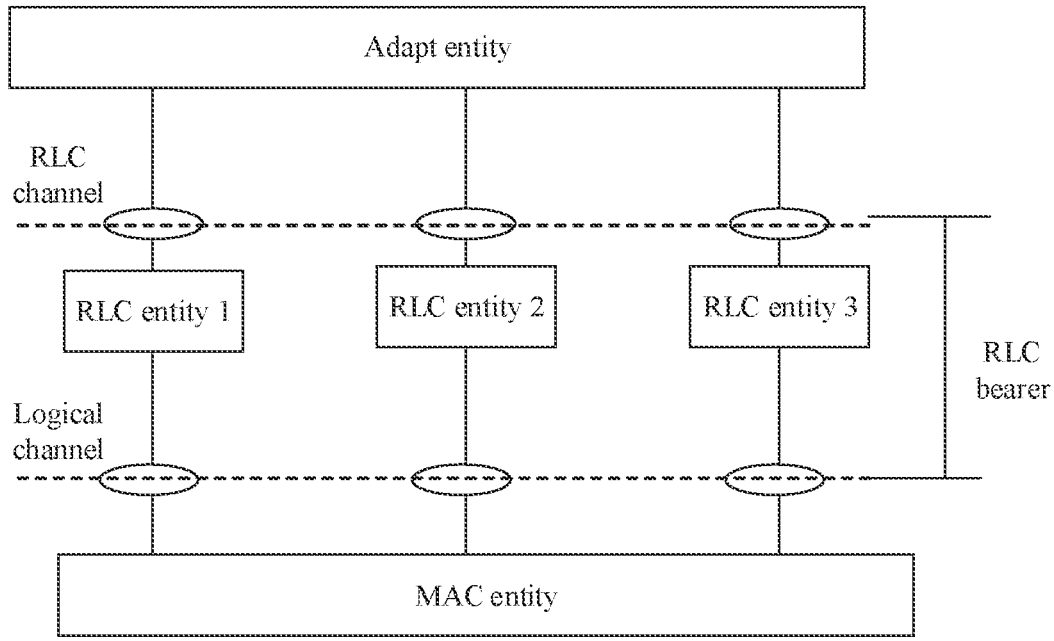
Figure 5C:
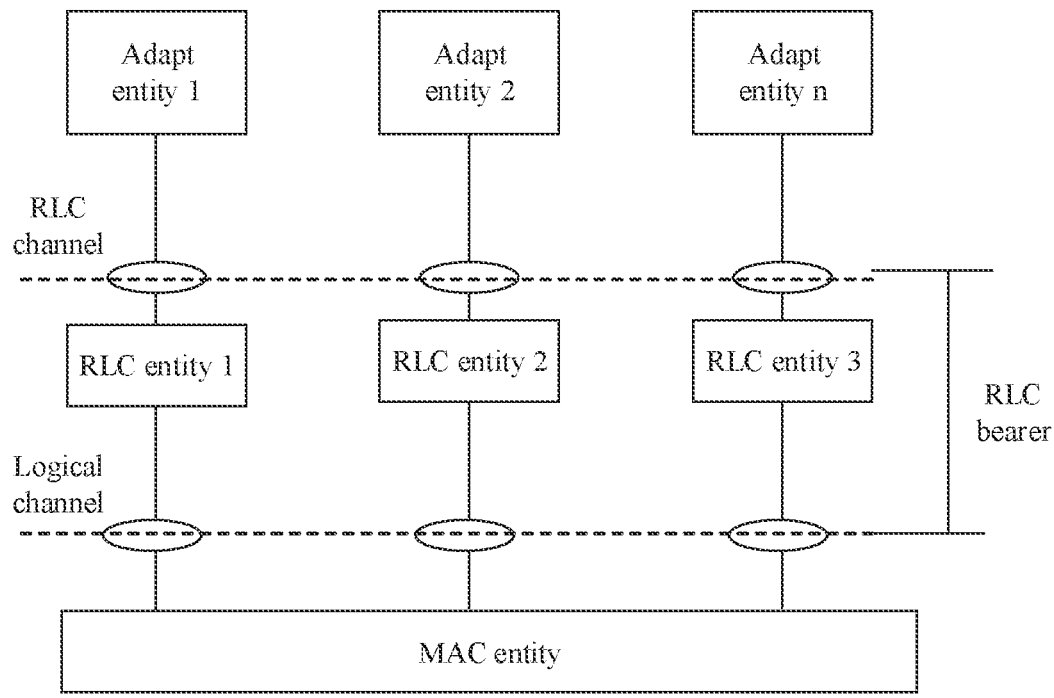

FIG. 5(a), FIG. 5(b), and FIG. 5(c) show a description of an RLC bearer/RLC channel on a wireless backhaul link. The RLC channel is a channel between an RLC layer and an upper-layer protocol layer (for example, between the RLC layer and an Adapt layer or between the RLC layer and a PDCP layer). As shown in FIG. 5(a), a configuration of a radio bearer (radio bearer, RB) corresponds to a configuration of a higher layer (for example, a PDCP layer) and a configuration of a lower layer (for example, an RLC layer and a MAC layer). A configuration of the RLC bearer refers to a configuration of a lower layer corresponding to the RB, and specifically includes a configuration of an RLC layer entity and a configuration of a MAC logical channel. As shown in FIG. 5(b) and FIG. 5(c), an RLC bearer of an IAB node on a wireless backhaul link still includes an RLC layer and a logical channel. An RLC channel on the wireless backhaul link may be a channel between an RLC layer and a PDCP layer, or may be a channel between an RLC layer and an Adapt layer. This is specifically determined based on an upper-layer protocol layer of the RLC layer. The RLC channel of the IAB node on the backhaul link is in a one-to-one correspondence with one RLC entity, and is also in a one-to-one correspondence with one RLC bearer. A main difference between FIG. 5(b) and FIG. 5(c) lies in that an adaptation layer entity in FIG. 5(b) corresponds to a plurality of RLC entities, and an adaptation layer entity in FIG. 5(c) is in a one-to-one correspondence with an RLC entity.

Figure 6:
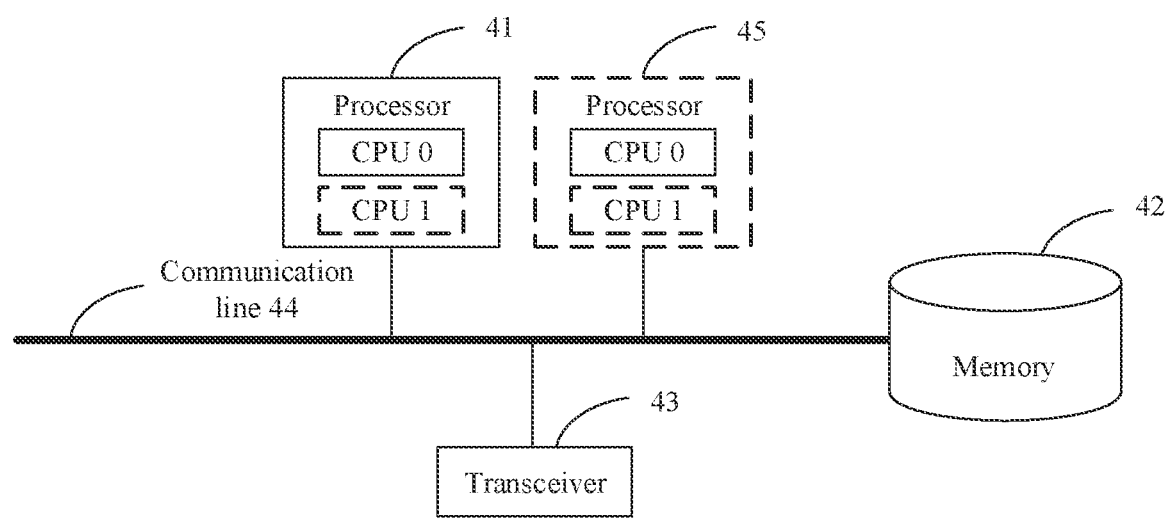
FIG. 6 is a schematic structural diagram of a communication device according to an embodiment of this application.

FIG. 6 is a schematic diagram of a hardware structure of a communication device according to an embodiment of this application. For hardware structures of the first device, the second device, and the first backhaul node in this embodiment of this application, refer to the schematic diagram of the hardware structure of the communication device shown in FIG. 6. The communication device includes a processor 41, a communication line 44, and at least one communication interface (where a transceiver 43 in FIG. 6 is used as an example for description).

The processor 41 may be a general-purpose central processing unit (CPU), a microprocessor, an application-specific integrated circuit (ASIC), or one or more integrated circuits configured to control program execution of the solutions of this application.

The communication line 44 may include a path for transmitting information between the foregoing components.

The transceiver 43 is configured to communicate, by using any apparatus such as a transceiver, with another device or a communication network such as the Ethernet, a radio access network (RAN), or a wireless local area network (WLAN).

Optionally, the communication device may further include a memory 42.

The memory 42 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory 42 is not limited thereto. The memory may exist independently, and is connected to the processor through the communication line 44. The memory may alternatively be integrated with the processor.

The memory 42 is configured to store computer-executable instructions for performing the solutions of this application, and the processor 41 controls execution of the computer-executable instructions. The processor 41 is configured to execute the computer-executable instructions stored in the memory 42, to implement the method for controlling a wireless backhaul link provided in the following embodiments of this application.

Optionally, the computer-executable instructions in this embodiment of this application may also be referred to as application program code. This is not specifically limited in this embodiment of this application.

During specific implementation, in an embodiment, the processor 41 may include one or more CPUs, such as a CPU 0 and a CPU 1 in FIG. 6.

During specific implementation, in an embodiment, the communication device may include a plurality of processors, such as the processor 41 and a processor 45 in FIG. 6. Each of these processors may be a single-core (e.g. single-CPU) processor or a multi-core (e.g. multi-CPU) processor. The processor herein may refer to one or more devices, circuits, and/or processing cores configured to process data (for example, computer program instructions).

The following describes in detail a communication method provided in the embodiments of this application with reference to FIG. 1 to FIG. 6.

It should be noted that in the following embodiments of this application, names of messages between network elements, names of parameters in messages, or the like are merely examples, and may be other names in specific implementations. This is not specifically limited in the embodiments of this application.

An embodiment of this application provides a method for controlling a wireless backhaul link. An execution body at a transmit end of the method for controlling a wireless backhaul link may be a first device, or may be a chip used in the first device. An execution body at a receive end of the method for controlling a wireless backhaul link may be a second device or a first backhaul node, or may be a chip used in the second device or a chip used in the first backhaul node. In the following embodiment, an example in which the execution body at the transmit end of the method for controlling a wireless backhaul link is the first device and the execution body at the receive end of the method for controlling a wireless backhaul link is the second device and the first backhaul node is used.

Figure 7:
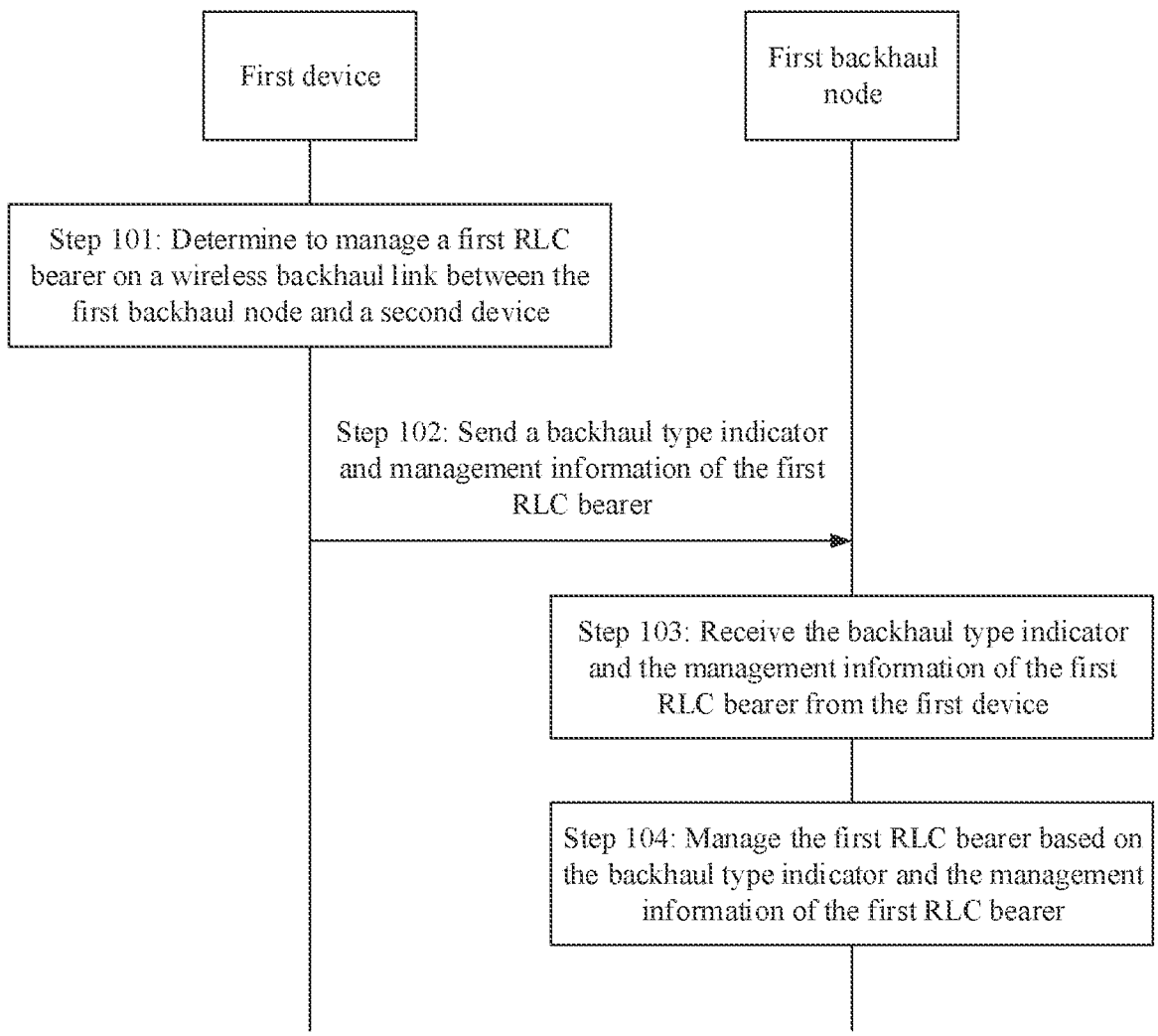

FIG. 7 is a schematic flowchart of a method for controlling a wireless backhaul link according to an embodiment of this application. The method may be used in the communication systems shown in FIG. 1 to FIG. 3(*a*) and FIG. 3(*b*). However, this embodiment of this application is not limited thereto. As shown in FIG. 7, the method includes the following steps.

Step 101: A first device determines to manage a first RLC bearer on a wireless backhaul link between a first backhaul node and a second device. The second device is a parent node of the first backhaul node.

In this embodiment of this application, on the wireless backhaul link, a backhaul type RLC bearer/an RLC channel is used for carrying data of a terminal, different RLC bearers/RLC channels may provide differentiated QoS transmission assurance, and an RB of the terminal may be mapped to the RLC bearer/RLC channel on the wireless backhaul link for transmission, to meet a QoS requirement (for example, a delay or a guaranteed transmission rate) of the radio bearer of the terminal.

A mapping manner from the RB of the terminal to the RLC bearer/RLC channel on the backhaul link may be that one RB is mapped to one RLC bearer/RLC channel on the backhaul link in a one-to-one manner, or a plurality of RBs (which may be a plurality of RBs of one terminal or a plurality of RBs of a plurality of different terminals) are mapped to one RLC bearer/RLC Channel on one backhaul link. An RLC channel is in a one-to-one correspondence with an RLC bearer. Therefore, the RLC bearer is used as an example for description in this embodiment of this application, and the RLC bearer in this embodiment of this application may alternatively be replaced with the RLC channel for understanding.

The RLC bearer on the wireless backhaul link may be identified by using identification information of the RLC bearer. The identification information of the RLC bearer may be an identifier (ID) of the RLC channel or an identifier of the RLC bearer, or may be a logical channel identifier (LCID). The identification information of the RLC bearer is not limited in this application.

For example, when a donor base station is in a form in which a CU is separated from a DU, the first device may be a CU of the donor base station, and the second device may be a DU of the donor base station. For example, as shown in FIG. 4, the first device is the CU, the second device is the donor DU, and the first backhaul node may be the IAB node 1. It should be understood that, if the CU is in a form in which a CP is separated from a UP, the first device may alternatively be a CU-CP.

For example, when the donor base station is an access network element having a complete base station function, the second device may be a second backhaul node, and the first device may be the donor base station. For example, as shown in FIG. 4, the first device is the donor base station, the second device is the IAB node 1, and the first backhaul node is the IAB node 2.

It should be understood that there may be one or more RLC bearers on a wireless backhaul link between the first device and the second device. The first RLC bearer is only any one of one or more RLC bearers.

It should be understood that, in addition to the backhaul type RLC bearer used to transmit the data of the terminal, there may also be an access type RLC bearer, on the wireless backhaul link between the first backhaul node and the second device, used to carry MT access traffic. This embodiment of this application mainly focuses on management of the backhaul type RLC bearer.

The management of the backhaul type RLC bearer in this embodiment of this application may be establishment of the backhaul type RLC bearer, deletion of the backhaul type RLC bearer, or modification of the backhaul type RLC bearer.

Step 102: The first device sends a backhaul type indicator and management information of the first RLC bearer to the first backhaul node. The backhaul type indicator is used to indicate that the first RLC bearer is used to transmit the data of the terminal. In other words, the backhaul type indicator is used to indicate that the first RLC bearer is used to transmit backhaul traffic of the terminal.

For example, the backhaul type indicator in this embodiment of this application is used to indicate that a type of the first RLC hearer is to serve the backhaul traffic. In other words, the backhaul type indicator is used to indicate that the type of the first RLC bearer is the backhaul type RLC bearer.

The data of the terminal may include downlink data of the terminal and uplink data of the terminal.

For example, the backhaul type indicator and the management information of the first RLC bearer may be carried in a message that is used for configuring the first RLC bearer.

For example, the first device may send a first message to the first backhaul node, where the first message carries the backhaul type indicator and the management information of the first RLC bearer. In other words, the backhaul type indicator and the management information of the first RLC bearer may be carried in a same message and sent by the first device to the first backhaul node. Certainly, the backhaul type indicator and the management information of the first RLC bearer may alternatively be separately carried in different messages and sent by the first device to the first backhaul node. For example, the first message may be a radio resource control (RRC) message.

The management information that is of the first RLC bearer and that is sent to the first backhaul node is used by the first backhaul node to determine a radio bearer that is of the terminal and that is mapped to the first RLC bearer. Alternatively, the management information that is of the first RLC bearer and that is sent to the first backhaul node is further used to determine an RLC bearer or a logical channel that is between the first backhaul node and a child node of the first backhaul node and that is mapped to the first RLC bearer.

In an optional implementation, the management information of the first RLC bearer may further include an identifier of the first RLC bearer or an identifier of the RLC channel.

It should be noted that the backhaul type indicator sent by the first device to the first backhaul node may explicitly indicate the type of the first RLC bearer, or may implicitly indicate the type of the first RLC bearer.

For example, when the backhaul type indicator is indicated in an explicit manner, the backhaul type indicator may be directly and explicitly carried in the message used by the first device to configure the first RLC bearer. For example, the message used by the first device to configure the first RLC bearer carries indication information, and the indication information indicates that the type of the RLC bearer is the backhaul type. Alternatively, the message used by the first device to configure the first RLC bearer carries indication information, and the indication information is used to indicate that an upper-layer protocol layer that is associated with an RLC layer entity corresponding to the RLC bearer is an Adapt layer. In other words, it means that the type of the RLC bearer is the backhaul type.

For example, the backhaul type indicator may alternatively be carried in an implicit manner. For example, for an RLC bearer X (where an RLC entity corresponding to the RLC bearer X associates with an upper-layer PDCP layer entity) that is used to carry MT access traffic, when a logical channel of the RLC bearer X is established, an RLC-BearerConfig information element carries an identifier of a radio bearer (for example, a DRB ID or an SRB ID). For a first RLC bearer (where an RLC entity corresponding to the first RLC bearer is associated with an upper-layer Adapt layer entity) that is used to carry backhaul traffic, when a logical channel of the first RLC bearer is established, an RLC-BearerConfig information element for configuring the RLC entity does not carry an identifier of a radio bearer. Therefore, when the logical channel of the RLC bearer is established, whether the RLC bearer is used to carry the MT access traffic (where the RLC entity corresponding to the RLC bearer is associated with the upper-layer PDCP layer entity) or the backhaul traffic (where the RLC entity corresponding to the RLC bearer is associated with the upper-layer Adapt layer entity) may be indicated by whether the RLC-BearerConfig information element includes the identifier of the radio bearer.

Step 103: The first backhaul node receives the backhaul type indicator and the management information of the first RLC bearer from the first device.

Step 104: The first backhaul node manages, based on the backhaul type indicator and the management information of the first RLC bearer, the first RLC bearer on the wireless backhaul link between the first backhaul node and the second device.

For example, if the first backhaul node determines that the first RLC bearer between the first backhaul node and the second device needs to be modified, a configuration of the first RLC bearer is modified on the wireless backhaul link between the second device and the first backhaul node based on the backhaul type indicator and the management information of the first RLC bearer, and a mapping rule of the first RLC bearer is modified again.

In an optional implementation, after completing the configuration of the first RLC bearer, the first backhaul node may further send a configuration complete message to the first device, where the configuration complete message is used to indicate that the first backhaul node completes management of the first RLC bearer.

For example, if the first device determines to modify the first RLC bearer, the management information of the first RLC bearer may be identification information of the first RLC bearer and an updated configuration message of the first RLC bearer. The updated configuration message of the first RLC bearer may be an updated QoS parameter of the first RLC bearer. If the first device determines to establish the first RLC bearer, the management information of the first RLC bearer may be a configuration message required for establishing the first RLC bearer. For example, the configuration message includes one or more of an RLC layer configuration, an identifier of a logical channel, a logical channel configuration, and a MAC layer configuration.

This embodiment of this application provides the method for controlling a wireless backhaul link. The first device determines to manage the first radio link control RLC bearer on the wireless backhaul link between the first backhaul node and the second device, and then sends the backhaul type indicator and the management information of the first RLC bearer to the first backhaul node. In this way, the first backhaul node can perceive in time that the first RLC bearer that carries the data of the terminal needs to be managed between the first backhaul node and the second device based on the backhaul type indicator, and complete management of the first RLC bearer based on the management information of the first RLC bearer. Therefore, it is ensured that a specified QoS requirement can be met when the data of the terminal is transmitted on the first RLC bearer, thereby ensuring reliable transmission.

Figure 8:
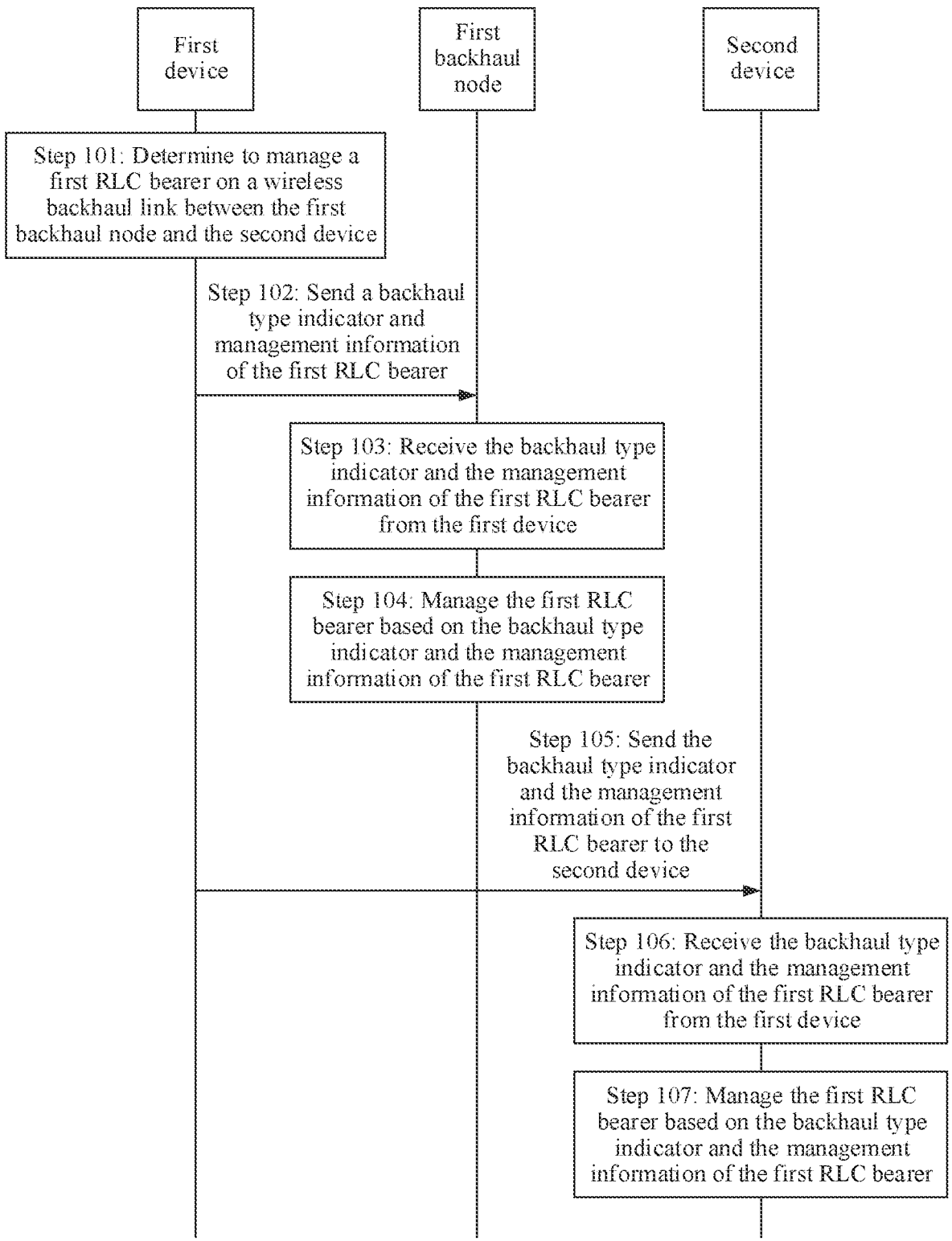

In an optional embodiment, as shown in FIG. 8, the method provided in this embodiment of this application further includes the following steps.

Step 105: The first device sends the backhaul type indicator and the management information of the first RLC bearer to the second device.

Optionally, the first device may further send a quality of service parameter of the first RLC bearer to the second device.

For example, the QoS parameter may include any one or more of the following information: a priority, a delay, a bandwidth, a guaranteed bit rate, a maximum transmission rate, a minimum transmission bandwidth, a maximum transmission bandwidth, a guaranteed rate type, and a non-guaranteed rate type.

It should be understood that the first RLC bearer may support N:1 bearer mapping (that is, data in radio bearers of a plurality of terminals may be mapped to the first RLC bearer for transmission) or 1:1 bearer mapping (that is, data in a radio bearer of only one terminal is mapped to the first RLC bearer for transmission). Therefore, if the first RLC bearer is an N:1 RLC bearer, the QoS parameter of the first RLC bearer needs to meet a sum of QoS requirements of radio bearers that are of all terminals and that are mapped to the first RLC bearer. Alternatively, if the first RLC bearer is a 1:1 RLC bearer, the QoS parameter of the first RLC bearer needs to meet a QoS requirement of a radio bearer that is of the terminal and that is mapped to the RLC bearer.

For example, the QoS parameter is a delay. If two radio bearers of a terminal 1 and a terminal 2 are both mapped to the first RLC bearer, a delay of the radio bearer of the terminal 1 is required to be less than a delay 1, and a delay of the radio bearer of the terminal 2 is required to be less than a delay 2. If the delay 1 is greater than the delay 2, in the QoS parameter of the first RLC bearer, it is required that the delay is at least less than the delay 2.

Step 106: The second device receives the backhaul type indicator and the management information of the first RLC bearer from the first device.

Optionally, the second device may further receive the quality of service parameter of the first RLC hearer from the first device.

It should be understood that, that the first device sends the management information of the first RLC hearer to the first backhaul node by using step 102 is described above. Because nodes at the two ends of the wireless backhaul link on which the first RLC bearer is located are respectively the first backhaul node and the second device, the second device may complete management of the first RLC bearer by using step 106.

Step 107: The second device manages, based on the backhaul type indicator and the management information of the first RLC bearer, the first RLC bearer on the wireless backhaul link between the second device and the first backhaul node.

Similarly, after step 107, after completing the configuration of the first RLC bearer, the second device may further send a configuration complete message to the first device. The configuration complete message is used to indicate that the second device completes management of the first RLC bearer.

It should be noted that in this embodiment of this application, the first device may first perform step 105, and then perform step 102. That is, step 101 and step 105 to step 107 may be used as an independent embodiment. Certainly, step 105 to step 107 may alternatively be performed before step 102 to step 104. It should be understood that steps in the optional embodiments in the embodiments of this application may be combined with each other.

In an optional implementation, the first device is the CU of the donor base station, the second device is the DU of the donor base station, and the management information of the first RLC bearer includes any one or more of the following information: description information of a traffic flow that is mapped to the first RLC bearer or a radio bearer that is of the terminal and that is mapped to the first RLC bearer, where the description information of the traffic flow includes any one or more of the following information included in an IP layer header: differentiated services code point (DSCP) information or flow label information in an IPv6 header. In this way, it is equivalent to that when the first RLC bearer is configured during the configuration of the DU, a configuration of a downlink bearer mapping relationship is directly carried, and no additional signaling is required to configure downlink bearer mapping of the first RLC bearer.

It should be understood that the description information is used to determine the traffic flow.

For example, the information about the radio bearer of the terminal may be an identifier (e.g. UE ID) of the terminal and an identifier (e.g. a DRB ID or an SRB ID) of the radio bearer that is in at least one radio bearer of the terminal and that is mapped to the first RLC bearer. Alternatively, the information about the radio bearer of the terminal is in a one-to-one correspondence with an IP address of the radio bearer of the terminal+GPRS tunneling protocol-user plane (GTP-U) tunnel endpoint identifier (TEID).

For example, the identifier of the terminal may be an international mobile subscriber identity (IMSI), a temporary mobile subscriber identity (TMSI), a cell radio network temporary identifier (C-RNTI), an identifier allocated by the donor base station to the terminal, or the like. This is not limited in this application.

For example, if the second device receives a downlink data packet of the terminal, the second device may determine, based on DSCP information or flow label flow label information carried in the downlink data of the terminal or the identifier of the radio bearer of the terminal, to map the downlink data packet of the terminal to a specified first RLC bearer and transmit the downlink data packet of the terminal to the first backhaul node. In other words, the second device may determine specific downlink data packets of the terminal that are served by the first RLC bearer.

Figure 9:
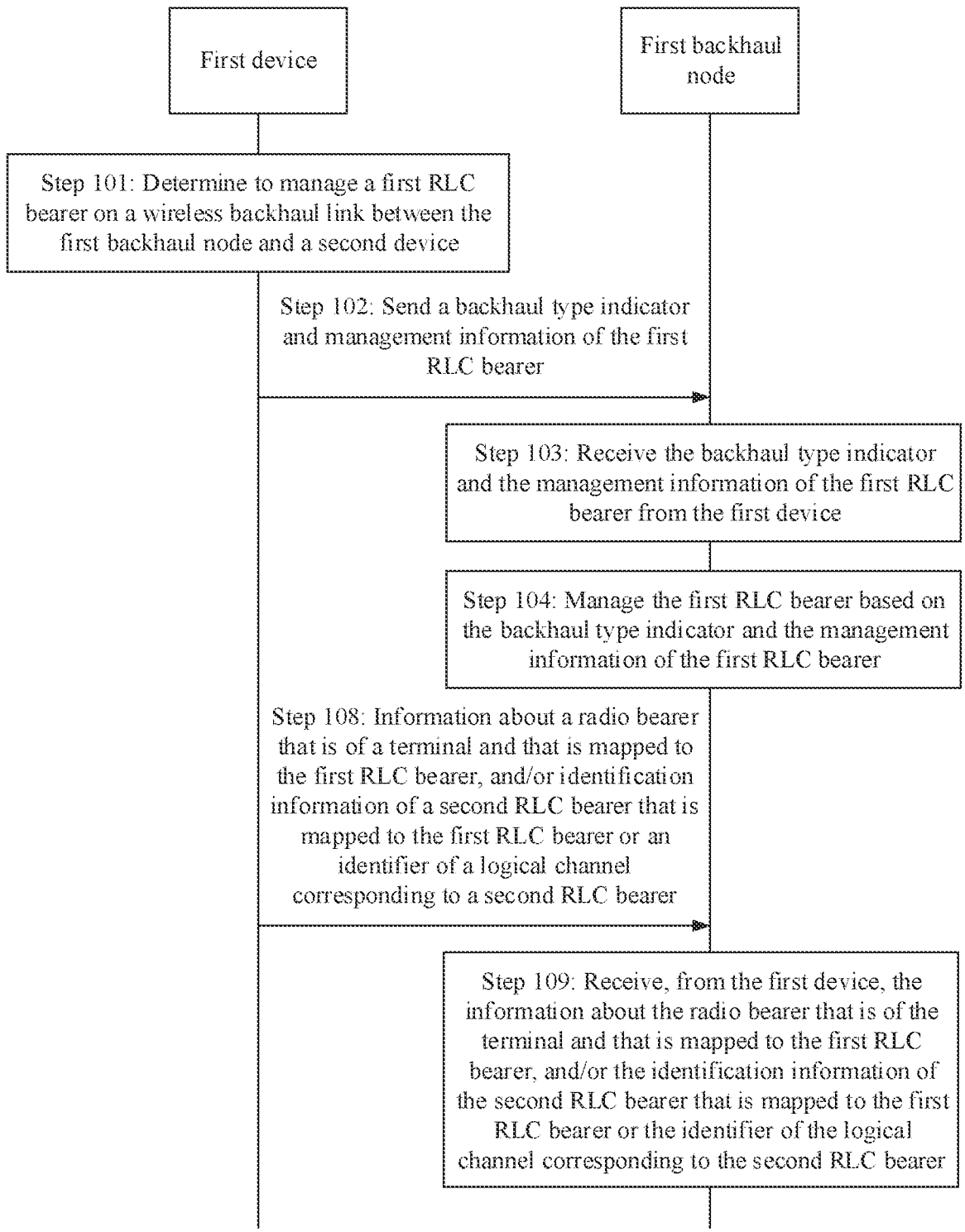

In an optional embodiment, as shown in FIG. 9, the method provided in this embodiment of this application further includes the following steps.

Step 108: The first device sends, to the first backhaul node, the information about the radio bearer that is of the terminal and that is mapped to the First RLC bearer, and/or identification information of a second RLC bearer that is mapped to the first RLC bearer or an identifier of a logical channel corresponding to a second RLC bearer.

It should be understood that, in this embodiment of this application, if an RLC bearer does not have an identifier, but a logical channel has an identifier, because one RLC bearer includes one unique logical channel, the RLC bearer may be determined based on the identifier of the logical channel.

The second RLC bearer is an RLC bearer on a wireless backhaul link between the first backhaul node and a third backhaul node. The third backhaul node is a child node of the first backhaul node.

For example, FIG. 4 is used as an example. In this example, the first device is the CU of the donor base station, the second device is the DU of the donor base station, the first backhaul node is the IAB node 1, the third backhaul node is the IAB node 2, and the first RLC bearer is an RLC bearer on a wireless backhaul link between the IAB node 1 and the DU of the donor base station. In this case, the donor base station may send, to the IAB node 1, the information about the radio hearer that is of the terminal and that is mapped to the first RLC hearer, or the identification information of the second RLC bearer on the wireless backhaul link between the LAB node 1 and the IAB node 2.

It should be understood that the terminal in this embodiment of this application may have one or more radio bearers. The information about the radio bearer of the terminal is used to identify each radio bearer.

For example, the first device may send a mapping relationship between the first RLC bearer and the second RLC bearer to the first backhaul node, or the first device may send a mapping relationship between the first RLC bearer and the information about the radio bearer of the terminal to the first backhaul node.

Step 109: The first backhaul node receives, from the first device, the information about the radio bearer that is of the terminal and that is mapped to the first RLC bearer, and/or the identification information of the second RLC bearer that is mapped to the first RLC bearer or the identifier of the logical channel corresponding to the second RLC bearer.

It should be understood that the first backhaul node may determine the mapping rule related to the first RLC bearer in step 108 and step 109. For example, for downlink transmission, the first backhaul node receives, on the first RLC bearer, the downlink data of the terminal that is sent by the second device, and the first backhaul node maps the downlink data of the terminal that is transmitted on the first RLC bearer to the second RLC bearer between the first backhaul node and the third backhaul node, and transmits the downlink data to the third backhaul node. For uplink transmission, the first backhaul node receives, by using the second RLC bearer, the uplink data of the terminal that is sent by the third backhaul node, and the first backhaul node maps the uplink data of the terminal to the first RLC bearer between the first backhaul node and the second device, and transmits the uplink data to the second device. Alternatively, the first backhaul node receives uplink data of a radio bearer belonging to the terminal, and the first backhaul node maps the uplink data to the first RLC bearer between the first backhaul node and the second device, and transmits the uplink data to the second device.

For example, there are a plurality of first RLC bearers on the wireless backhaul link between the first backhaul node and the second device. For example, the plurality of first RLC bearers include an RLC bearer 11 and an RLC bearer 12. There are a plurality of second RLC bearers on the wireless backhaul link between the first backhaul node and the third backhaul node. For example, the plurality of second RLC bearers include an RLC bearer 21 and an RLC bearer 22. There is a mapping relationship between the RLC bearer 11 and the RLC bearer 22, and there is a mapping relationship between the RLC bearer 12 and the RLC bearer 21. If the first backhaul node receives the downlink data of the terminal on the RLC bearer 11, the first backhaul node may map the downlink data to the Ur bearer 22 and transmit the downlink data to the third backhaul node. Alternatively, if the first backhaul node receives the uplink data of the terminal on the RLC bearer 22, the first backhaul node may include the uplink data of the terminal in the RLC bearer 11 and transmit the uplink data of the terminal to the second device.

It should be noted that in this embodiment of this application, a manner in which the first backhaul node obtains, from the first device, the information about the radio bearer that is of the terminal and that is mapped to the first RLC bearer and/or the identification information of the second RLC bearer or the identifier of the logical channel corresponding to the second RLC bearer is described in step 108 and step 109. Certainly, if there is a second RLC bearer between the first backhaul node and the third backhaul node, for uplink transmission/downlink transmission, the first backhaul node may directly establish a mapping relationship between the second RLC bearer and the first RLC bearer, and/or the first backhaul node may directly establish a mapping relationship between the radio bearer of the terminal and the first RLC bearer.

For example, FIG. 2 is used as an example. For example, the first backhaul node is the IAB node 03, and the first RLC bearer is an RLC bearer on a wireless backhaul link between the IAB node 03 and the IAB node 02. There are an RB 1, an RB 2, and an RB 3 between the terminal and the IAB node 03. If the radio bearer that is of the terminal and that is mapped to the first RLC bearer and that is sent by the donor base station and received by the IAB node 03 is the RB 3, the IAB node 03 may establish a mapping relationship between the first RLC bearer and the RB 3. In an uplink transmission process, after the IAB node 03 receives the uplink data of the terminal on the RB 3, the IAB node 03 sends the uplink data of the terminal to the IAB node 2 by using the first RLC bearer.

For example, FIG. 2 is used as an example. The first backhaul node is the IAB node 02, the second device is the donor base station, the third backhaul node is the IAB node 03, there is an RLC bearer 14 between the IAB node 02 and the donor base station, and there is an RLC bearer 15 between the IAB node 03 and the IAB node 02. If the IAB node 02 receives that the second RLC bearer that is mapped to the first RLC bearer 14 and that is sent by the donor base station is the RLC bearer 15, the IAB node 02 may establish a mapping relationship between the RLC bearer 15 and the RLC bearer 14. For uplink transmission, if the IAB node 02 receives the uplink data of the terminal on the RLC bearer 15, the IAB node 02 sends the uplink data of the terminal to the donor base station by using the RLC bearer 14. For downlink transmission, if the IAB node 02 receives the downlink data of the terminal on the RLC bearer 14, the IAB node 02 sends the downlink data of the terminal to the IAB node 03 by using the RLC bearer 15.

In an optional implementation, after step 109, the first backhaul node may further send a first response message to the first device, where the first response message is used to indicate that the identification information of the second RLC bearer that is mapped to the first RLC bearer, the information about the radio bearer of the terminal, or the identifier of the logical channel corresponding to the second RLC bearer has been obtained.

In a possible embodiment, step 101 in this embodiment of this application may be specifically implemented in the following manner 1 or manner 2.

Manner 1: When managing the radio bearer of the terminal, the first device determines to manage the first RLC bearer on the wireless backhaul link between the first backhaul node and the second device.

Specifically, when the terminal accesses the core network by using at least one backhaul node, the terminal may establish a session with the core network, to establish/modify the RB of the terminal. For example, in the 4G network, the session may be a public data network (PDN) connection. In the 5G network, the session may be a packet data unit (PDU) session.

Manner 2: When the first backhaul node accesses the first device, the first device determines to manage the first RLC bearer on the wireless backhaul link between the first backhaul node and the second device.

Optionally, before step 101 is implemented in the manner 2, the method provided in this embodiment of this application further includes: The first backhaul node sends a second message to the first device, where the second message is used to indicate, to the first device, that the first backhaul node is a backhaul node.

Figure 10:
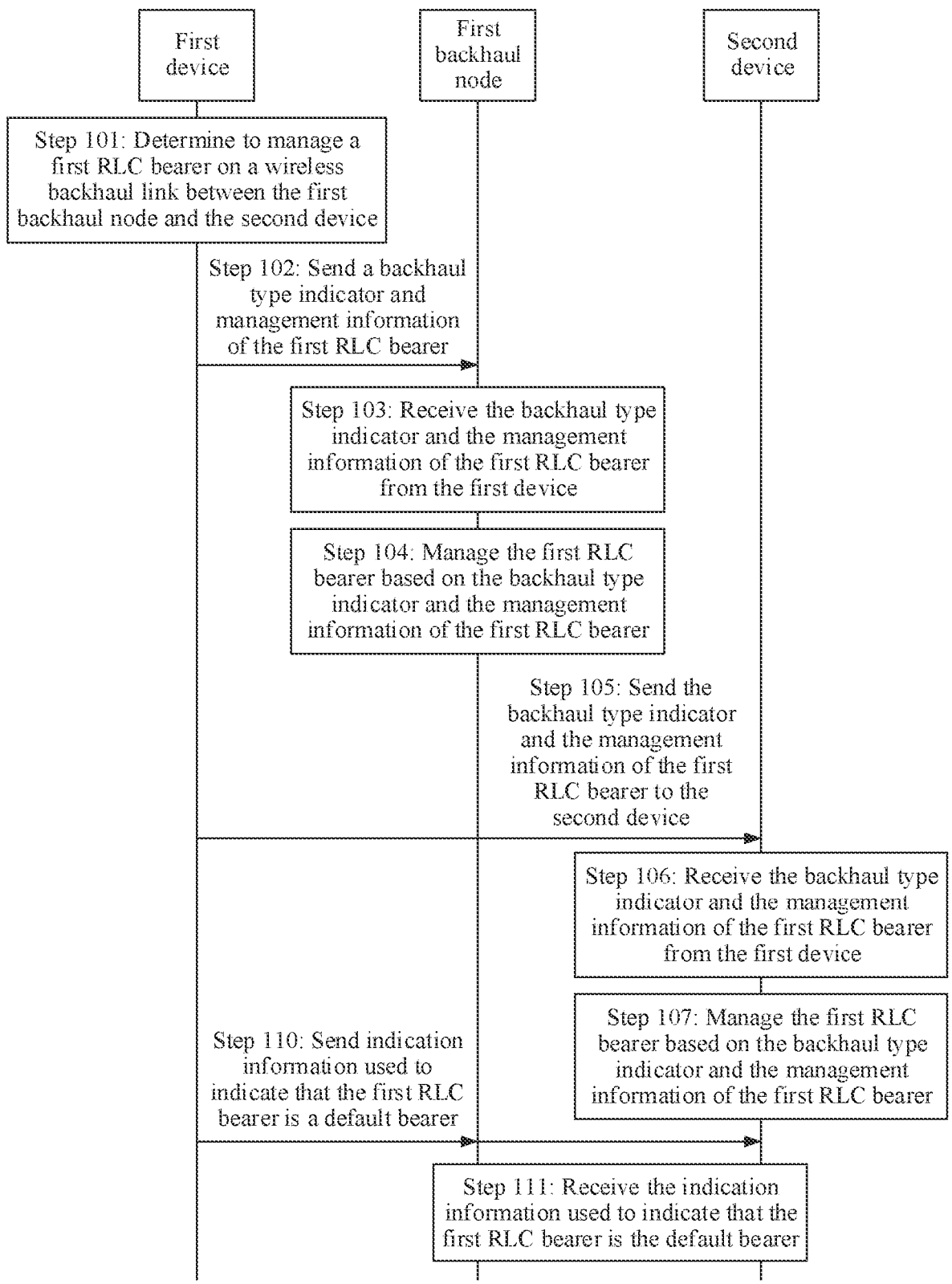

It should be understood that, when step 101 is implemented in the manner 2, in a possible embodiment, as shown in FIG. 10, the method provided in this embodiment of this application further includes the following steps.

Step 110: The first device sends, to the first backhaul node and/or the second device, indication information used to indicate that the first RLC bearer is a default bearer.

Specifically, the first device sends, to the first backhaul node and/or the second device, the indication information used to indicate that the first RLC bearer is a default backhaul type RLC.

Step 111: The first backhaul node and/or the second device receives, from the first device, the indication information used to indicate that the first RLC bearer is the default bearer.

The indication information used to indicate that the first RLC bearer is the default bearer may be carried in the first message, or may be sent to the first backhaul node by using a message other than the first message.

It should be understood that, in the embodiment shown in FIG. 10, the terminal may not access the first backhaul node in this case. Therefore, when the first backhaul node accesses the first device, the first device may indicate to establish the default backhaul type RLC bearer between the first backhaul node and the second device. In this way, when the data packet of the terminal received by the first backhaul node needs to be transmitted to the second device and no proper mapping rule can be found for the data packet of the terminal, the data packet of the terminal may be mapped to the first RLC bearer for transmission.

In an optional implementation, in addition to the default backhaul type RLC bearer that may be established between the first backhaul node and the second device, there is a default radio bearer used to transmit traffic of the first backhaul node. The default radio bearer is used to transmit access traffic (e.g. MT access traffic) of the first backhaul node, and the default radio bearer is different from the first RLC bearer that is used as the default backhaul type RLC bearer.

It should be understood that, when step 101 is implemented in the manner 2, because the terminal may not access the first backhaul node in this case, the donor base station does not determine the quality of service parameter requirement of the terminal. However, to facilitate timely transmission of the data of the terminal after the terminal accesses the first device, in another possible implementation, the first RLC bearer in this embodiment of this application is specific to the quality of service parameter requirement of the terminal.

In other words, if the first backhaul node accesses the first device, the first backhaul node may further pre-establish, based on the information received in step 102, a plurality of first RLC bearers on the wireless backhaul link between the first backhaul node and the second device based on a quality of service parameter requirement of traffic of the terminal. In other words, the plurality of first RLC bearers may meet quality of service parameter requirements of different traffic of the terminal. In this case, because the terminal may not access the first backhaul node, for the quality of service parameter requirement of the traffic of the terminal, refer to a corresponding QoS parameter in the standardized 5QI.

It should be understood that there may also be a default radio bearer, on the wireless backhaul link between the first backhaul node and the second device, used to transmit access traffic of the first backhaul node. For example, the default radio hearer is used to carry MT access traffic of the first backhaul node.

Figure 11A:
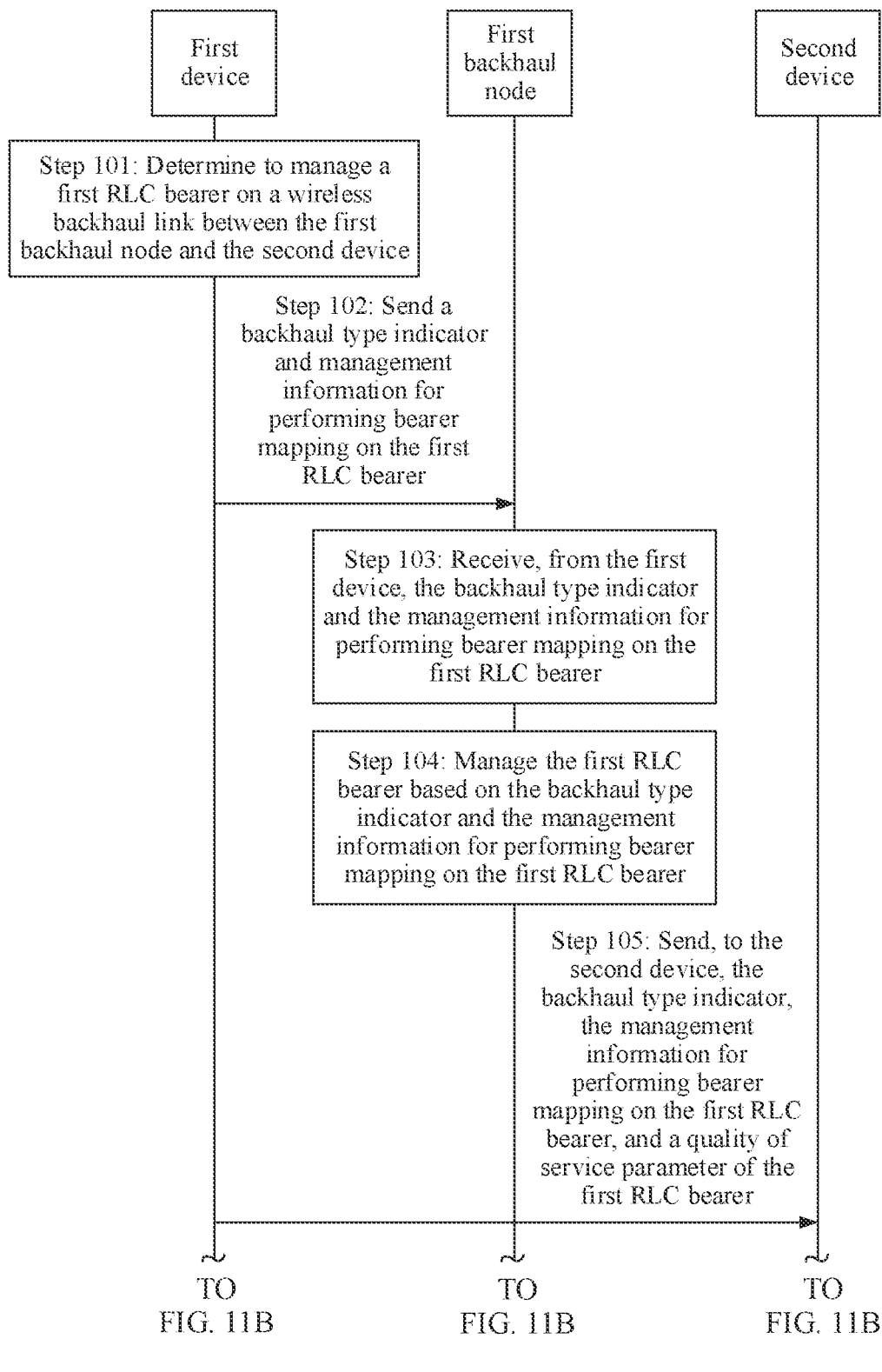
Figure 11B:
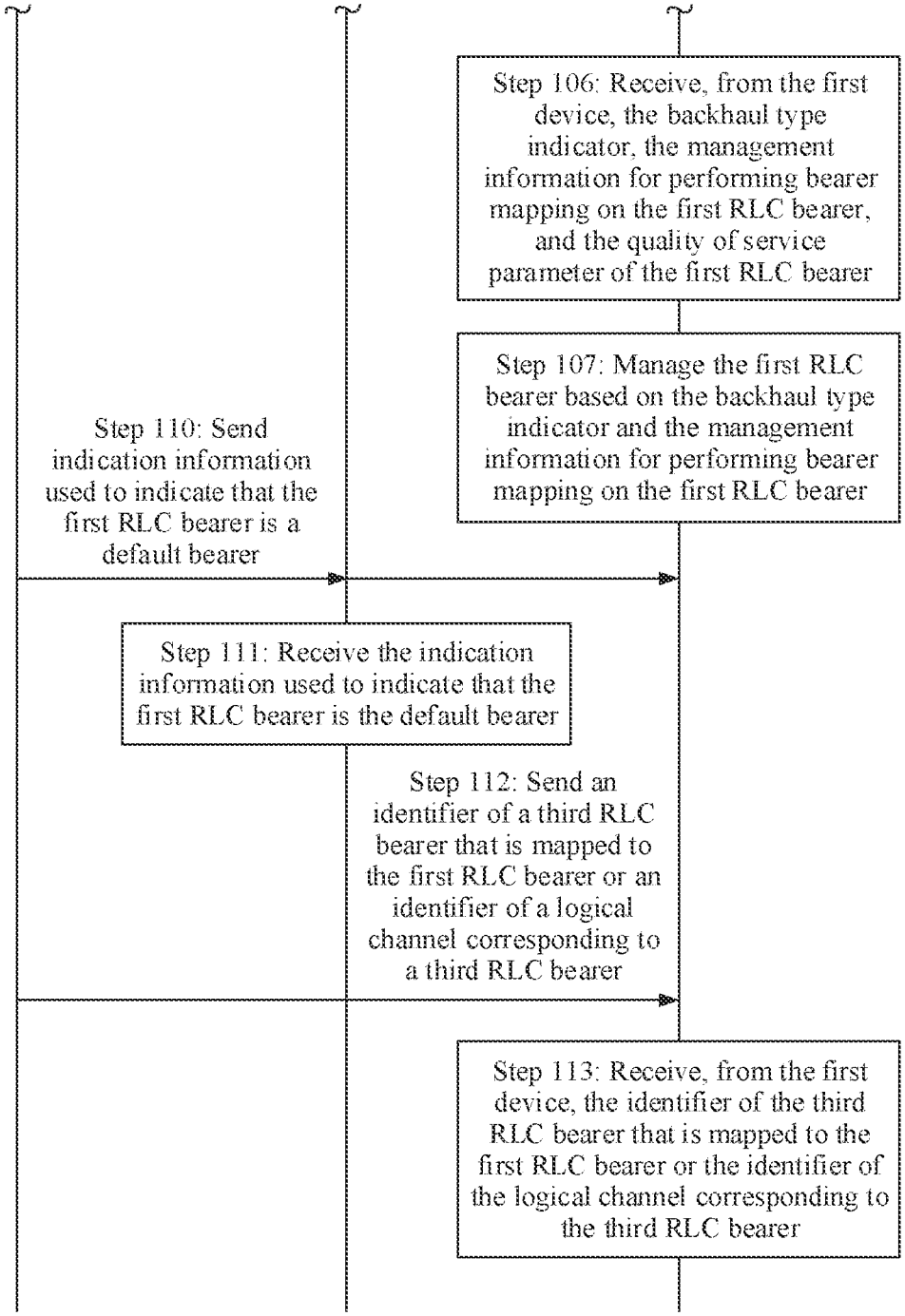
Figure 12:
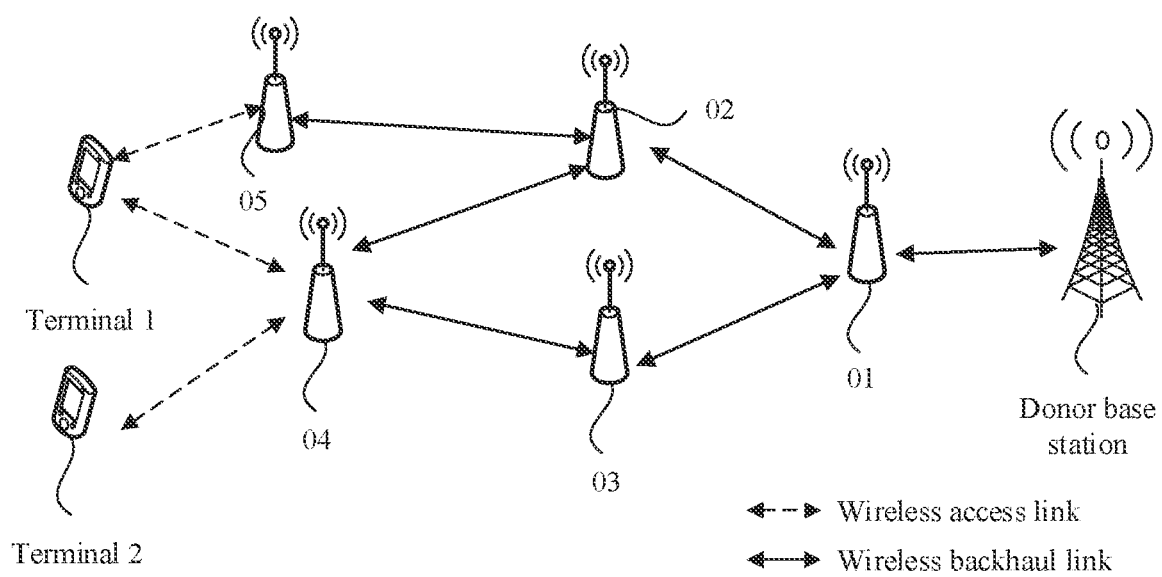
FIG. 12 is a schematic structural diagram 3 of a wireless backhaul communication system according to an embodiment of this application.

In an optional embodiment, as shown in FIG. 11A and FIG. 11B, the method provided in this embodiment of this application further includes the following steps.

Step 112: The first device sends, to the second device, identification information of a third RLC bearer that is mapped to the first RLC bearer or an identifier of a logical channel corresponding to a third RLC bearer. The third RLC bearer is an RLC bearer on a wireless backhaul link between the second device and a fourth device. The fourth device is a parent node of the second device. It should be understood that, in this case, the second device is the second backhaul node.

For example, as shown in FIG. 2, the first device is the donor base station, the second device is the IAB node 03, the fourth device is the IAB node 01, and the first backhaul node is the IAB node 04. That the first RLC bearer between the IAB node 04 and the IAB node 03 is an RLC bearer 34 is used as an example. In this case, the donor base station may send, to the IAB node 03, an identifier of an RLC bearer 31 that is mapped to the RLC bearer 34. The RLC bearer 31 is an RLC bearer on a wireless backhaul link between the IAB node 03 and the IAB node 01.

Step 113: The second device receives, from the first device, the identification information of the third RLC bearer that is mapped to the first RLC bearer or the identifier of the logical channel corresponding to the third RLC bearer.

It should be understood that, by performing step 112 and step 113, the second device may determine to map, during uplink transmission, the uplink data of the terminal on the first RLC bearer to the third RLC bearer and transmit the uplink data to the fourth device. For downlink transmission, the second device may map, to the first RLC bearer, the downlink data of the terminal on the third RLC bearer, and transmit the downlink data to the first backhaul node.

Figure 13:
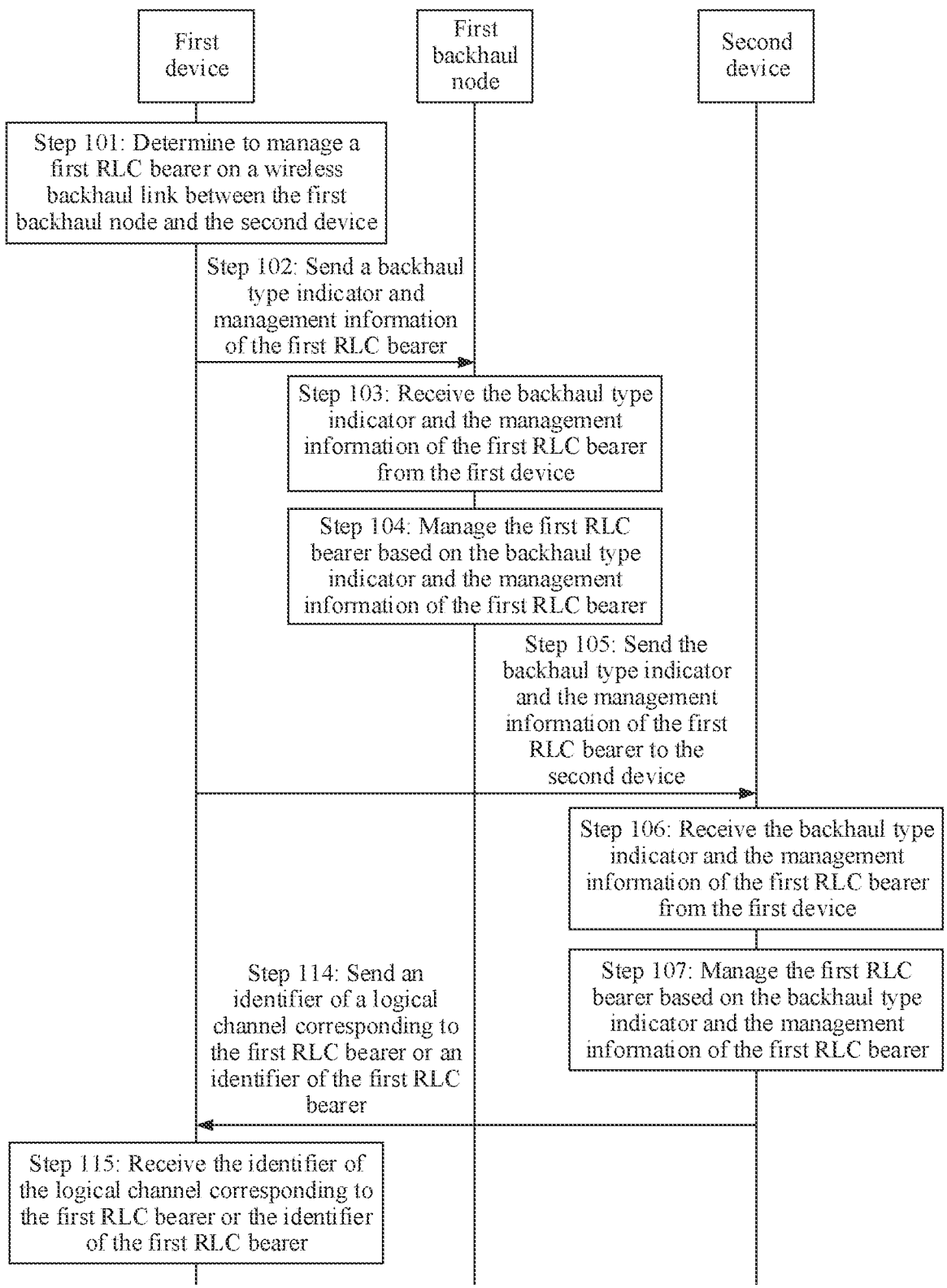
FIG. 13 is a schematic diagram of another method for controlling a wireless backhaul link according to an embodiment of this application.

In an optional embodiment, as shown in FIG. 13, the method provided in this embodiment of this application further includes the following steps.

Step 114: The second device sends, to the first device, an identifier of a logical channel corresponding to the first RLC bearer or identification information of the first RLC bearer.

For example, the second device may send a third message to the first device, where the third message includes the identifier of the logical channel corresponding to the first RLC bearer or the identification information of the first RLC bearer.

In an optional implementation, if the second device determines that the first RLC bearer needs to be established, the second device completes establishment of the first RLC bearer based on the information received in step 106, and allocates an identifier to the first RLC bearer. If the first device indicates to newly establish the first RLC bearer, and the first device has allocated the identifier to the first RLC bearer, the first device further needs to send, to the second device, the identifier allocated by the first device to the first RLC bearer. Step 114 may be omitted.

It should be understood that, after the second device establishes or manages the first RLC bearer based on the backhaul type indicator of the first device, the management information for performing bearer mapping on the first RLC bearer, and the quality of service parameter of the first RLC bearer, the identifier of the logical channel corresponding to the first RLC bearer or the identification information of the first RLC bearer may be sent to the first device. In this way, the first device configures a bearer mapping rule related to the first RLC bearer for the first backhaul node or the second device.

Step 115: The first device receives, from the second device, the identifier of the logical channel corresponding to the first RLC bearer or the identification information of the first RLC bearer.

If the first device receives the identifier of the logical channel corresponding to the first RLC bearer or the identification information of the first RLC bearer, when configuring the bearer mapping rule related to the first RLC bearer for the first backhaul node or the second device, the first device may use the identifier of the logical channel corresponding to the first RLC bearer or the identification information of the first RLC bearer. For example, the first device sends, to the second device, a mapping relationship between the identification information of the first RLC bearer and identification information of an RLC bearer between the second device and a parent node.

In an optional embodiment, the method provided in this embodiment of this application further includes: The first device sends, to the first backhaul node, management information used to manage the second RLC bearer. The first backhaul node receives, from the first device, the management information used to manage the second RLC bearer. It should be understood that, if the first device determines that the first backhaul node and the third backhaul node already have the second RLC bearer, the step in which the first device sends, to the first backhaul node, the management information used to manage the second RLC bearer may be omitted. That is, this step is optional.

For example, the management information used to manage the second RLC bearer may include a backhaul type indicator and management information for performing bearer mapping on the second RLC bearer. It should be understood that, in this case, the backhaul type indicator for the second RLC bearer is used to indicate that the second RLC bearer is in a backhaul traffic type.

For example, if a wireless backhaul node includes a DU and an MT, and if a message sent by the first device to the first backhaul node is used to manage a first RLC bearer between the first backhaul node and a parent node, the first device may send the management information of the first RLC bearer and the backhaul type indicator to the MT of the first backhaul node. If a message sent by the first device to the first backhaul node is used to manage the second RLC bearer between the first backhaul node and the child node, the first device may send the management information of the first RLC bearer and the backhaul type indicator to the DU of the first backhaul node.

For a relay system operating in an SA mode or a wireless backhaul communication system operating in an NSA mode as shown in FIG. 3(a), in an optional embodiment, the first device in this embodiment of this application may obtain the quality of service parameter from the core network that serves the IAB node. For the relay system operating in the NSA mode, as shown in FIG. 3(b), in an optional embodiment, the first device in this embodiment of this application may receive the quality of service parameter from the core network via the first base station. The first device establishes a connection to the core network via the first base station.

In the NSA architecture, if no RLC bearer used to transmit a control plane message is configured between the donor base station and the first backhaul node or the second backhaul node, the backhaul type indicator sent by the donor base station to each backhaul node and the management information for performing bearer mapping between each backhaul node and a lower-level device or an upper-level node may be generated by the donor base station and then sent by the first base station to each backhaul node. For example, with reference to FIG. 3(b), the management information of the first RLC bearer may be generated by the donor base station, and then the donor base station sends the backhaul type indicator and the management information of the first RLC bearer to the first base station. In this way, the first base station sends the backhaul type indicator and the management information of the first RLC bearer to the first backhaul node.

In an optional implementation, for the scenario shown in FIG. 3(b), that the first device sends the management information used to manage the second RLC bearer to the first backhaul node may be specifically implemented in the following manner: The first device sends, to the first base station, a first indicator and the management information used to manage the second RLC bearer. The first indicator is used to indicate to send, to the first backhaul node, the management information used to manage the second RLC bearer. Correspondingly, the first backhaul node may receive, via the first base station, the management information that is from the first device and that is used to manage the second RLC bearer.

It should be noted that, for the scenario shown in FIG. 3(b), the F1AP message that is of the DU part and that is sent by the donor base station (or the donor CU or the CU-CP) to each backhaul node needs to be first sent by the donor base station to the first base station through the first interface between the donor base station and the first base station. For example, the F1AP message is sent to the first base station by using a first interface application protocol (AP) message (for example, an XnAP message, an X2 AP message, or an F1AP message, which depends on a type of the first interface), where the first indicator may be carried and used to indicate to forward the F1AP message to the designated backhaul node. The first base station encapsulates the F1AP message in an RRC message and sends the RRC message to the MT part of the backhaul node. The RRC message may be of a newly defined special type, and is specially used to carry the F1AP message. Alternatively, an existing RRC message may be modified to carry a first interface AP message container, and the first interface AP message container is sent to the backhaul node. Alternatively, a second indicator may be added to indicate that the RRC message includes a first interface AP message container. After receiving the RRC message including the first interface AP message, the MT part of the IAB node obtains the first interface AP message, and then transmits the first interface AP message to the DU part of the backhaul node. Similarly, the F1AP message sent by the DU part of the backhaul node to the donor base station (or the donor CU or the donor CU-UP) also needs to be first sent to the MT part of the same backhaul node, and the MT encapsulates the F1AP message in the RRC message and sends the RRC message to the first base station. Then, the first base station sends, to the donor base station through the first interface, the F1AP message included in the RRC message.

It should be understood that, if the first base station is an eNB, the first interface may be an X2 interface. If the first base station is a gNB, the first interface may be an Xn interface.

Figure 14A:
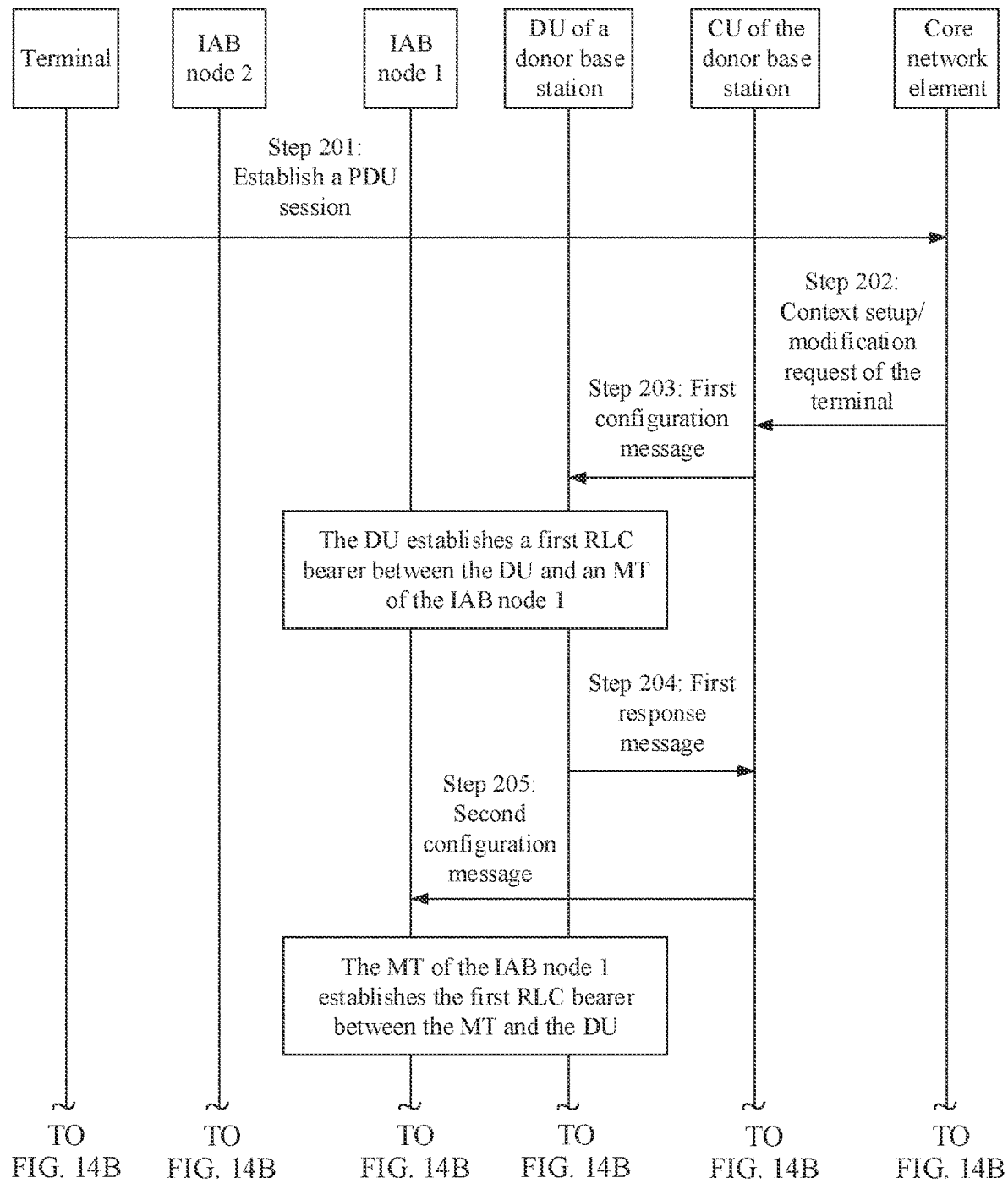
FIG. 14A and FIG. 14B are a schematic flowchart 1 of a specific embodiment of a method for controlling a wireless backhaul link according to an embodiment of this application.
Figure 14B:
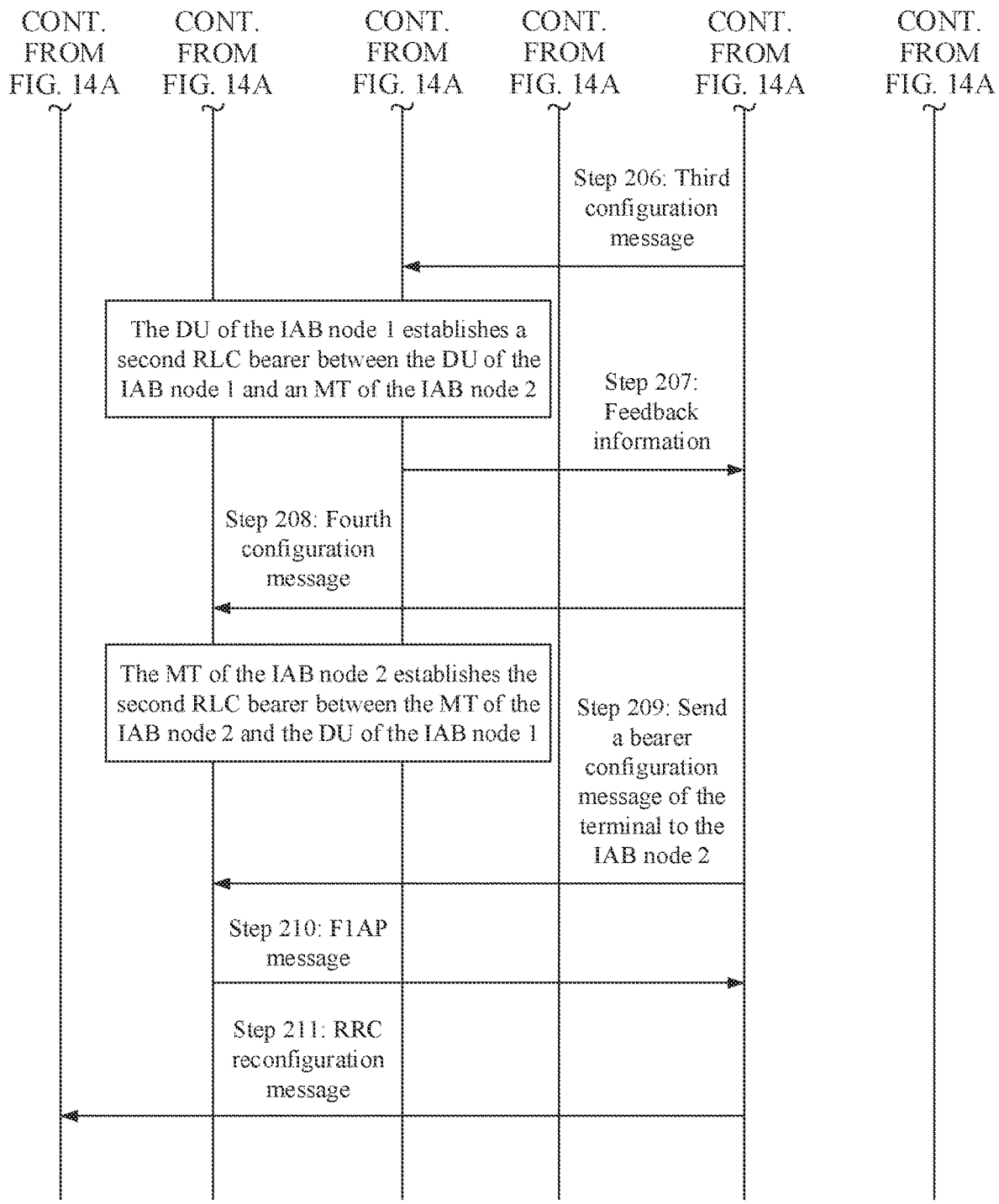

As shown in FIG. 14A and FIG. 14B, an example in which there are the IAB node 2 and the IAB node 1 between the terminal and the donor base station, the first backhaul node is the IAB node 1, the third backhaul node is the IAB node 2, the first device is the CU of the donor base station, the second device is the DU of the donor base station, each IAB node includes a DU and an MT, and the terminal accesses the IAB node 2 is used to describe in detail a process of triggering and managing the first RLC bearer by the CU. The method includes the following steps.

Step 201: Establish a PDU session between the terminal and a core network element, including establishment of an RRC connection between the terminal and the CU.

Step 202: The core network element (for example, an access and mobility management function (AMF) network element in 5GC) sends a context setup/modification request of the terminal to the CU of the donor base station.

The context setup/modification request of the terminal includes: a QoS profile related to traffic of the terminal. For example, after the core network element receives a PDU session establishment request (included in an initial UE message sent by the CU to the core network) of the terminal, the core network element sends a session management message of an N2 interface to the CU, for example, an initial UE context setup request message. In another example, when a PDU session of the terminal needs to be modified, the core network element (for example, an AMF network element) further sends a session management message of an N2 interface to the CU, for example, a context modification message of the terminal, where the context modification message includes an updated QoS profile configuration.

Step 203: The CU of the donor base station sends a first configuration message to the DU of the donor base station.

The first configuration message is used to configure a first RLC bearer on a wireless backhaul link between the DU of the donor base station and the MT of the IAB node 1.

The first configuration message includes a backhaul (BH) type indicator (that is, indicating that a type of the first RLC bearer that needs to be established/modified and that is on the wireless backhaul link between the DU of the donor base station and the MT of the IAB node 1 is a type serving backhaul traffic rather than MT access traffic serving the IAB node 1) and a QoS parameter corresponding to the first RLC bearer. For example, the type of the first configuration message may be an F1AP message. For the QoS parameter corresponding to the first RLC bearer, refer to the description in the foregoing embodiment. Details are not described herein again.

In addition, optionally, the first configuration message may further include DSCP information/a value of flow label that may be mapped to the first RLC bearer, or information about a radio bearer specific to the terminal. For the information about the radio bearer of the terminal, refer to the description in the foregoing embodiment. Details are not described herein again.

Step 204: The DU of the donor base station feeds back a first response message to the CU of the donor base station. The first response message includes a setup response to the first RLC bearer.

For example, a type of the first response message may be an F1AP message.

Optionally, the first response message includes a cell group configuration message that needs to be sent to the MT part of the IAB node 1, and the CellGroupConfig includes configuration content (for example, an RLC-BearerConfig for the first RLC bearer) of the first RLC bearer that is on the wireless backhaul link and that is sent to the MT of the IAB node 1.

It should be noted that, an information element for configuring the first RLC bearer is described by using the RLC-BearerConfig for the first RLC bearer as an example in this embodiment of this application. Certainly, the information element configured for the first RLC bearer may alternatively have another name. This is not limited in this embodiment of this application. Unified description is provided herein, and details are not described subsequently.

For example, the information element for configuring the first RLC bearer includes any one or more of the following content: an identifier of a logical channel corresponding to the first RLC bearer, a configuration of a logical channel corresponding to the first RLC bearer, configuration content of an RLC layer corresponding to the first RLC bearer, and an identifier of the first RLC bearer.

Optionally, the first response message may further include an identifier LCID x of a logical channel corresponding to the first RLC bearer, so that the CU configures a bearer mapping rule for uplink/downlink transmission on the DU part of the IAB node 1.

Step 205: The CU of the donor base station sends a second configuration message to the IAB node 1.

For example, in step 205, the CU of the donor base station may send the second configuration message to the MT of the IAB node 1.

The second configuration message is used to configure the first RLC bearer on the wireless backhaul link between the MT of the IAB node 1 and the DU of the donor base station. The first configuration message may be an RRC message. For example, the first configuration message includes a backhaul type indicator and a configuration of the first RLC bearer (including a configuration of an RLC entity, a configuration of a logical channel, and the like). Content for configuring the first RLC bearer on the wireless backhaul link is carried by using the RLC-BearerConfig information element. Optionally, the backhaul type indicator may also be carried in the RLC-BearerConfig information element.

Optionally, the second configuration message may further include bearer information of the terminal associated with the first RLC bearer. Optionally, the second configuration message further includes identification information of a second RLC bearer that is mapped to the first RLC bearer or an identifier of a logical channel corresponding to a second RLC bearer.

It should be noted that, a premise is that the second RLC bearer/logical channel on the wireless backhaul link between the IAB node 1 and the IAB node 2 has been pre-established (for example, before step 205, the second RLC bearer/logical channel on the wireless backhaul link between the IAB node 1 and the AB node 2 has been established). That is, if the second RLC bearer/logical channel between the IAB node 1 and the IAB node 2 is not established, the donor base station may not send the identification information of the second RLC bearer that is mapped to the first RLC bearer or the identifier of the logical channel corresponding to the second RLC bearer. In this embodiment of this application, the donor base station may not send the identification information of the second RLC bearer that is mapped to the first RLC bearer or the identifier of the logical channel corresponding to the second RLC bearer. In other words, the second configuration message does not include the identification information of the second RLC bearer that is mapped to the first RLC bearer or the identifier of the logical channel corresponding to the second RLC bearer.

Note: After completing the configuration of the first RLC bearer, the IAB node 1 further needs to feed back a configuration complete message to the CU. For example, the MT of the IAB node 1 sends an RRC reconfiguration complete message to the CU, and a feedback step is not shown in FIG. 14A and FIG. 14B.

Step 206: The CU sends a third configuration message to the IAB node 1. The third configuration message is used to configure the second RLC bearer on the wireless backhaul link between the IAB node 1 and the IAB node 2.

Specifically, step 206 may be implemented in the following manner: The CU sends the third configuration message to the DU of the IAB node 1. For example, the third configuration message may be an F1AP message.

Specifically, the third configuration message is used to configure the second RLC bearer between the DU of the LAB node 1 and the MT of the IAB node 2. The third configuration message includes a backhaul type indicator and a QoS parameter corresponding to the second RLC bearer for a description of the QoS parameter of the second RLC bearer, refer to the description of the QoS parameter corresponding to the first RLC bearer in step 203).

Optionally, the third configuration message in step 206 further includes an identifier of an RLC bearer that is between the IAB node 1 and a parent node of the IAB node 1 and that may be mapped to the second RLC bearer, or an identifier of a logical channel on a wireless backhaul link between the IAB node 1 and the parent node of the IAB node 1, or an identifier of a radio bearer specific to the terminal.

Step 207: The IAB node 1 sends feedback information to the CU.

For example, the DU of the IAB node 1 sends the feedback information to the CU of the donor base station. For example, the feedback information may be an F1AP message, including a setup response to the second RLC bearer, where the response includes a cell group configuration message CellGroupConfig that needs to be sent to the MT part of the child node IAB node 2 of the IAB node 1, and the CellGroupConfig includes configuration content (for example, an RLC-BearerConfig for the second RLC bearer) of the second RLC bearer on the wireless backhaul link that needs to be sent to the MT of the IAB node 2. Optionally, the F1AP message in step 207 may further include an identifier of a logical channel corresponding to the second RLC bearer, so that the CU configures an uplink/downlink transmission mapping rule corresponding to the second RLC bearer for the IAB node 2, or configures an uplink/downlink transmission mapping rule corresponding to the second RLC bearer for the IAB node 1.

It should be understood that the IAB node 1 can manage the second RLC bearer between the DU of the IAB node 1 and the MT of the IAB node 2 by using step 206 and step 207.

Step 208: The CU sends a fourth configuration message to the IAB node 2.

Specifically, step 208 may be implemented in the following manner: The CU sends the fourth configuration message to the MT of the IAB node 2, to configure the second RLC bearer for the MT of the IAB node 2. The fourth configuration message may be an RRC message, and includes, for example, a backhaul type indicator and an RLC-BearerConfig part for configuring the second RLC bearer on the backhaul link, and may further include information about a radio bearer that is of the terminal and that is mapped to the second RLC bearer.

Optionally, the configuration message sent by the CU to the IAB node 2 further includes identification information of an RLC bearer that is on a wireless backhaul link between the IAB node 2 and a child node and that may be mapped to the second RLC bearer or an identifier of a logical channel corresponding to the RLC bearer.

It should be understood that, after step 201 to step 208 are performed, an RLC bearer that is used to transmit data of the terminal and that is on each segment of the wireless backhaul link has been established/modified.

Optionally, after the RLC bearer on each segment of the wireless backhaul link is established, the method may further include the following steps.

Step 209: The CU of the donor base station sends a bearer configuration message of the terminal to the IAB node 2. The bearer configuration message of the terminal is used to request to set up/modify a context of the terminal.

For example, the CU may send the F1AP message to the DU of the IAB node 2, and the F1AP message may include the bearer configuration message of the terminal. Specifically, for content of the bearer configuration message of the terminal, refer to a description in a conventional technology.

Step 210: The DU of the IAB node 2 sends the F1AP message to the CU of the donor base station. The F1AP message includes a response message for setup/modification of the context of the terminal. For details, refer to message content of a UE context setup response fed back by the DU to the CU in a conventional technology.

Step 211: The CU sends an RRC reconfiguration message to the terminal. The RRC reconfiguration message is used to establish a radio bearer of the terminal on the wireless access link.

Specifically, the RRC reconfiguration message is used to establish the radio bearer of the terminal on the wireless access link. For details, refer to a conventional technology. Details are not described herein.

Optionally, after completing the configuration, the terminal further needs to feed back, to the CU, that the RRC reconfiguration is completed.

Figure 15:
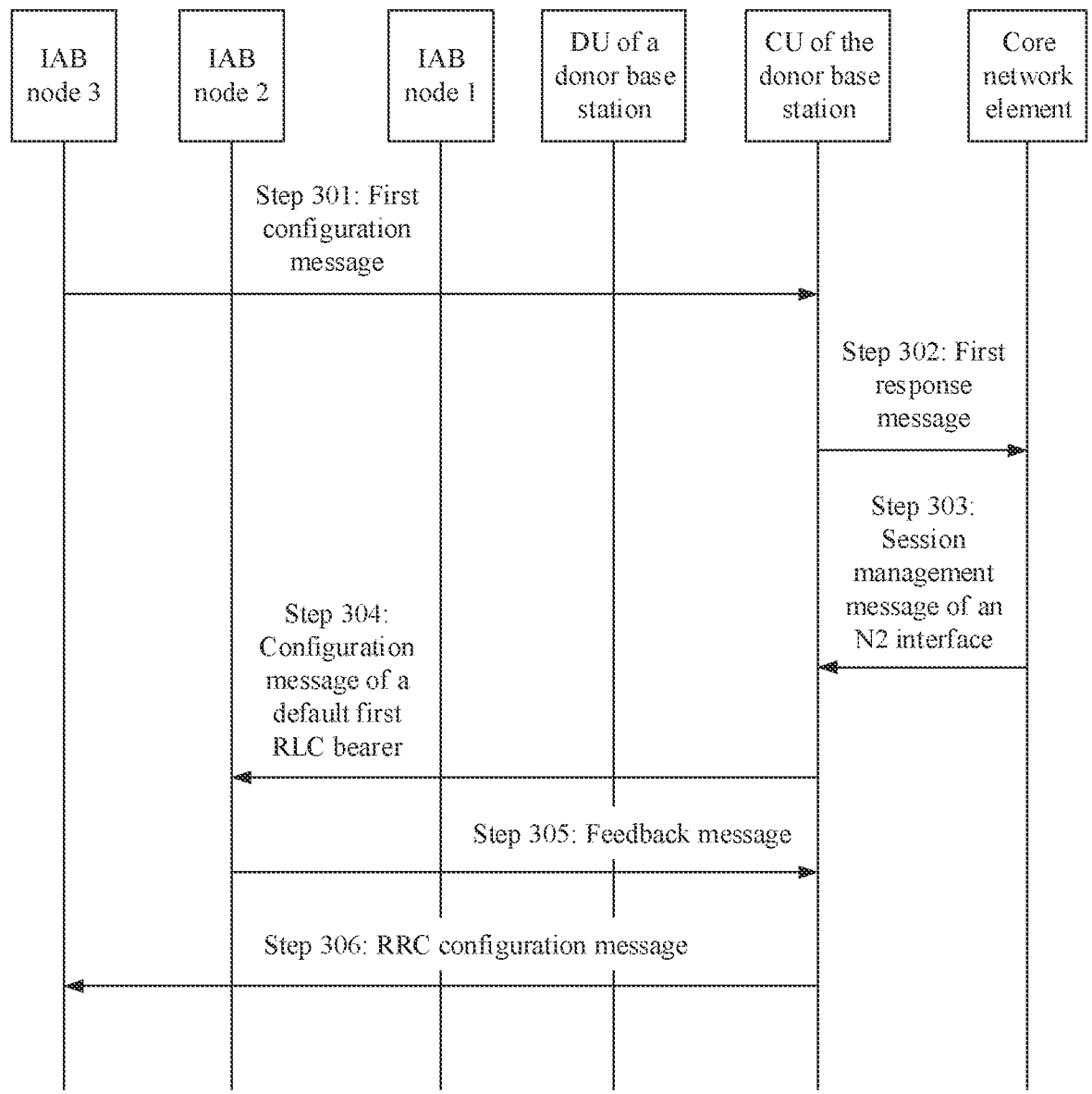
FIG. 15 is a schematic flowchart 2 of a specific embodiment of a method for controlling a wireless backhaul link according to an embodiment of this application.

As shown in FIG. 15, FIG. 15 shows another method for controlling a wireless backhaul link. A difference between the method and the method in FIG. 14A and FIG. 14B lies in that, after the IAB node 3 accesses a network, a default first RLC bearer, that is, a default backhaul type RLC bearer, is pre-established on a wireless backhaul link between the IAB node 3 and a parent node (for example, the IAB node 2) of the IAB node 3. A parent node of the IAB node 2 is the IAB node 1, and the IAB node 1 is connected to the donor base station. The method specifically includes the following steps.

Step 301: The IAB node 3 sends a first configuration message to a CU of the donor base station. The first configuration message includes identity indication information, and the identity indication information is used to indicate that the IAB node 3 is an IAB node. For example, the first configuration message may be an RRC message.

Step 302: The CU sends a first response message to a core network element (for example, an AMF network element). The first response message includes an identifier of the LAB node 3 and a POU session establishment request message. For example, the first response message is an initial UE message of the IAB node 3.

Step 303: The core network element (for example, the AMF) sends a second configuration message to the CU. The second configuration message includes a QoS profile configuration corresponding to an MT of the IAB node 3.

For example, the second configuration message may be a session management message of an N2 interface.

For example, the QoS profile configuration corresponding to the MT of the IAB node 3 includes a QoS parameter corresponding to the default first RLC bearer between the IAB node 3 and the parent node (for example, the IAB node 2). The session management message of the N2 interface may be, for example, an initial UE context setup request (initial UE context setup request) message or a UE context modification message.

Step 304: The CU sends a configuration message that includes the default first RLC bearer to the parent node (for example, the IAB node 2) of the IAB node 3.

For example, the CU sends an F1AP message to a DU of the IAB node 2. The F1AP message includes the configuration message of the default first RLC bearer. The configuration message of the default first RLC bearer includes the QoS parameter corresponding to the default first RLC bearer.

Optionally, the configuration message including the default first RLC bearer includes a backhaul type indicator (used to indicate that the first RLC bearer is of a backhaul type), and corresponds to a default indicator of the default first RLC bearer, and may further include identification information or an LCID of an RLC bearer between previous-hop nodes (for example, the IAB node 2 and the IAB node 1) to which the default first RLC bearer is mapped.

Step 305: The IAB node 2 sends a feedback message to the CU. The feedback message includes a profile (for example, an RLC-BearerConfig information element) that is sent to the LAB node 3, and is used to configure the first RLC bearer for the LAB node 3. The RLC-BearerConfig of the MT part of the IAB node 3 may include the default indicator corresponding to the default first RLC bearer, and may further carry an LCID allocated to a logical channel corresponding to the default first RLC bearer of the DU of the IAB node 2, so that the CU performs mapping configuration in a centralized bearer mapping rule configuration manner. The profile sent to the IAB node 3 is generated by the IAB node 2.

In this step, the feedback message sent by the IAL node 2 to the CU may be, for example, the F1AP message sent by the DU of the IAB node 2 to the CU.

Step 306: The CU sends an RRC configuration message to the MT part of the IAB node 3, to configure the default first RLC bearer. The RRC configuration message includes a backhaul type indicator, and a default indicator.

Optionally, the default indicator may be carried in an RLC-BearerConfig information element for configuring the first RLC bearer.

The default indicator sent to the MT part of the IAB node may be explicitly carried, or may be implicitly carried. For example, that the default indicator is explicitly carried means that a default indicator sub-information element is carried in the RLC-BearerConfig information element. For example, that the default indicator is implicitly carried means that it is specified or it is predefined in a protocol that a specific identifier default LCID of a logical channel corresponds to the default first RLC bearer. In this case, if the identifier of the logical channel included in the RLC-bearerConfig information element that is received by the MT and that is used to configure the default first RLC bearer is the default LCID, it may be learned that the first RLC bearer is the default backhaul type RLC bearer. For a specific manner of being explicitly carried or implicitly carried, refer to related descriptions in the foregoing embodiment. Details are not described herein again.

If the identifier of the logical channel included in the RLC-bearerConfig information element is the default LCID, it may be learned that the first RLC bearer is the default backhaul type RLC bearer.

After configurations of a corresponding RLC layer, a logical channel, and the like are performed according to the received configuration message, a default first RLC bearer that is used to bear backhaul traffic and that is on the wireless backhaul link between the IAB node 3 and the IAB node 2 is established.

Figure 16:
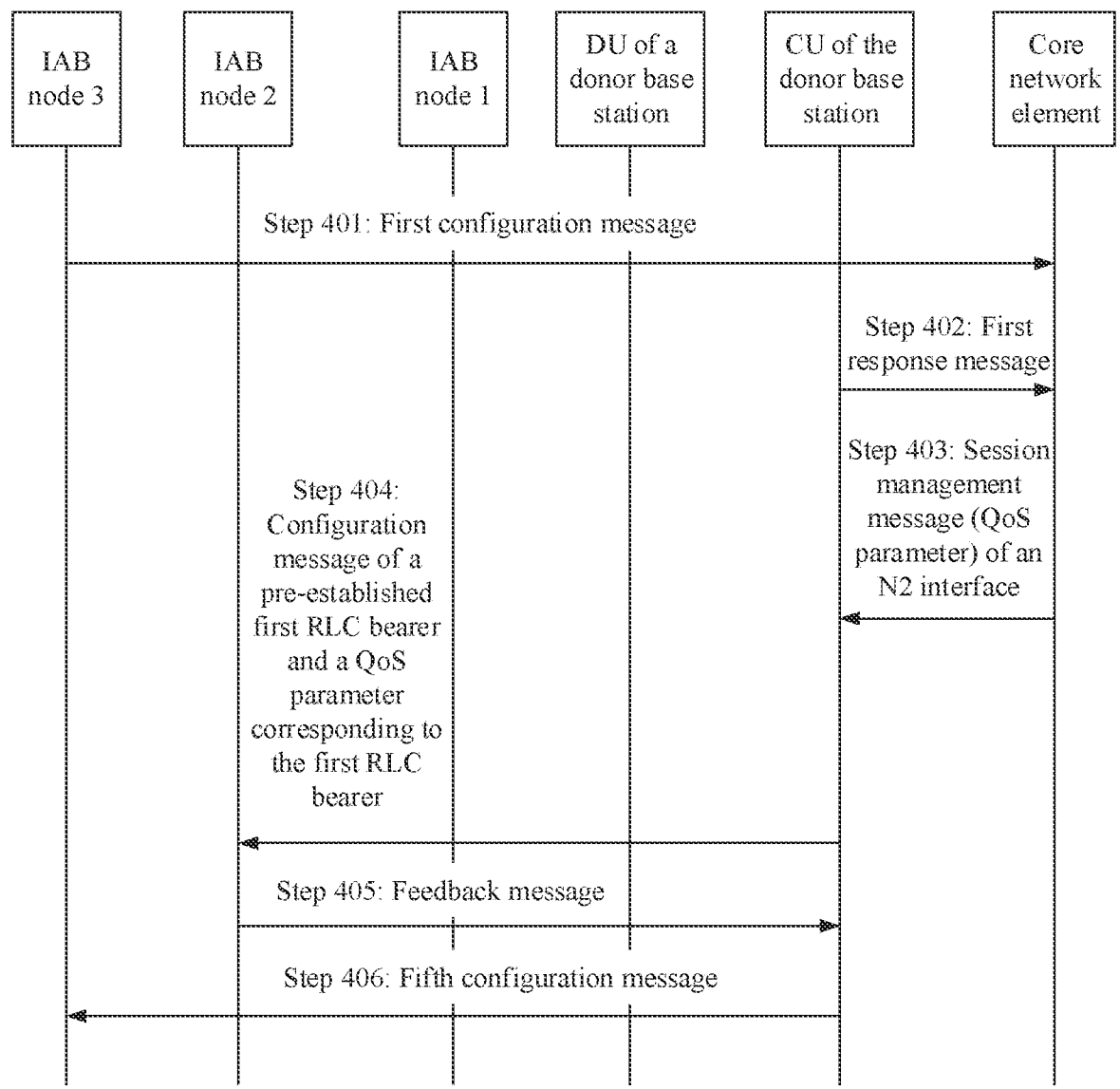
FIG. 16 is a schematic flowchart 3 of a specific embodiment of a method for controlling a wireless backhaul link according to an embodiment of this application.

In an implementation shown in FIG. 16, in a startup process, the IAB node establishes a default RLC bearer used for backhaul traffic. The default RLC bearer may be used to transmit some data of the terminal, and may be further used to transmit traffic of the DU part of the IAB node. For example, when the IAB node receives a data packet that needs to be forwarded, but the backhaul node cannot find a proper mapping rule for the wireless backhaul link, the data packet may be mapped to a default RLC bearer and to be sent to a next-hop node. For another example, in a startup process, the DU part of the IAB node needs to interact with the IAB donor node to establish secure transmission based on internet protocol security (IPSec), or needs to interact with the IAB donor node to establish an SCTP association. A data packet in a corresponding interaction process is mapped to a default RLC bearer for sending when being transmitted between the IAB node and a parent node of the IAB node.

As shown in FIG. 16, a difference between FIG. 16 and FIG. 15 lies in that when the IAB node 3 is started, a plurality of RLC bearers are pre-established between the LAB node 3 and the parent node of the IAB node 3. In FIG. 16, an RLC bearer established between the LAB node 3 and the LAB node 2 is pre-established on the wireless backhaul link between the IAB node and the IAB node 2 based on a QoS requirement of the terminal.

Step 401 to step 403 are the same as step 301 to step 303 in the embodiment shown in FIG. 15. For a specific process, refer to descriptions in step 301 to step 303. Details are not described herein again.

Specifically, in step 403, a QoS profile configuration corresponding to the MT of the IAB node 3 includes a QoS parameter corresponding, to the first RLC bearer established on the wireless backhaul link between the IAB node 3 and the parent node. For example, the QoS parameter corresponding to the first RLC bearer may be a corresponding QoS parameter in the standardized 5QI.

Step 404: The CU sends, to the parent node of the IAB node 3 (for example, the IAB node 2), a configuration message of the pre-established first RLC bearer and the QoS parameter corresponding to the pre-established first RLC bearer.

For example, the CU sends an F1AP message to the DU of the IAB node 2. The F1AP message includes the configuration message of the first RLC bearer and the QoS parameter corresponding to the first RLC bearer. Optionally, the configuration message of the pre-established first RLC bearer may further include identification information or an LCA of an RLC bearer that is between the IAB node 2 and the IAB node 1 and that is mapped to the pre-established first RLC bearer.

Step 405: The IAB node 2 sends a feedback message to the CU. The feedback message includes a profile (for example, an RLC-BearerConfig information element) that is sent to the MT part of the IAB node 3, and is used to configure the first RLC bearer for the IAB node 3. The RLC-BearerConfig of the MT part of the IAB node 3 may include an LCID allocated by the DU of the IAB node 2 to a logical channel corresponding to each pre-established BH RLC channel/RLC bearer, so that the CU performs mapping configuration in the centralized bearer mapping rule configuration manner. The profile sent to the IAB node 3 is generated by the IAB node 2.

For example, the feedback message may be the F1AP message sent by the DU of the IAB node 2 to the CU.

Step 406: The CU sends a fifth configuration message to the MT part of the IAB node 3, where the fifth configuration message is used to configure the pre-established first RLC bearer. For example, the fifth configuration message may include a backhaul type indicator.

Configurations of the corresponding RLC layer, the logical channel, a MAC layer, and the like are performed based on the received fifth configuration message, and the first RLC bearer that is used to bear the backhaul traffic and that is on the backhaul link between the IAB node 3 and the parent node IAB node 2 is established.

The foregoing mainly describes the solutions in the embodiments of this application from a perspective of interaction between network elements. It may be understood that, to implement the foregoing functions, each network element such as the first device, the second device, or the first backhaul node includes a corresponding hardware structure and/or software module for performing each function. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In the embodiments of this application, the first device, the second device, or the first backhaul node may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into units is an example, and is merely logical function division. In actual implementation, another division manner may be used.

The foregoing describes the methods in the embodiments of this application with reference to FIG. 7 to FIG. 16. The following describes communication apparatuses that are provided in embodiments of this application and that perform the foregoing methods. A person skilled in the art may understand that the method and the apparatus may be mutually combined and referenced. A communication apparatus provided in this embodiment of this application may perform the method performed by the transmit end in the foregoing method for controlling a wireless backhaul link, that is, the steps performed by the first device. Another communication apparatus may perform the method performed by the receive end in the method for controlling a wireless backhaul link in the foregoing embodiment, that is, the steps performed by the second device. Still another communication apparatus may perform the method performed by the receive end in the method for controlling a wireless backhaul link in the foregoing embodiment, that is, the steps performed by the first backhaul node.

An example in which each functional module is obtained through division based on each corresponding function is used below for description.

Figure 17:
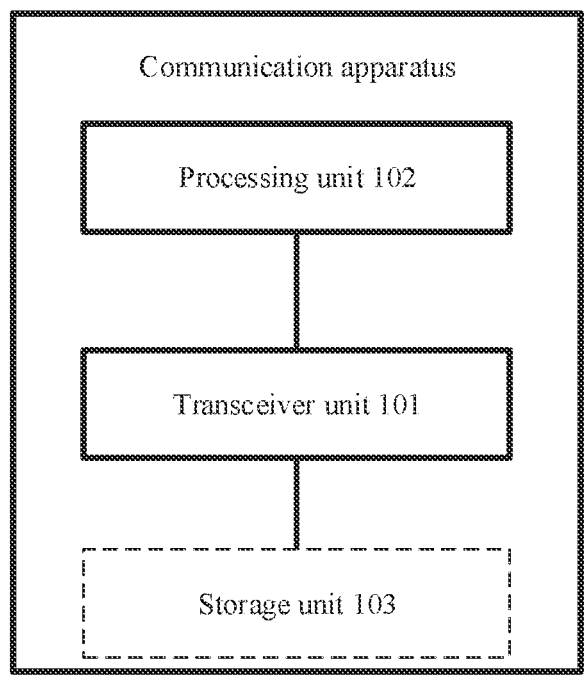
FIG. 17 is a schematic structural diagram 2 of a communication apparatus according to an embodiment of this application.

FIG. 17 is a schematic structural diagram of a communication apparatus according to an embodiment of this application. The communication apparatus may be the first device, the second device, or the first backhaul node in the embodiments of this application, or may be the chip used in the first device, the chip used in the second device, or the chip used in the first backhaul node. The communication apparatus includes a transceiver unit 101 and a processing unit 102. The transceiver unit 101 is configured to support the communication apparatus in performing a step of sending or receiving information. The processing unit 102 is configured to support the communication apparatus in performing a step of processing information.

In an example, the communication apparatus is the first device or the chip used in the first device. The transceiver unit 101 is configured to support the communication apparatus in performing step 102 in the foregoing embodiment. The processing unit 102 is configured to support the communication apparatus in performing step 101 in the foregoing embodiment.

In an optional implementation, the transceiver unit 101 is further configured to support the communication apparatus in performing step 105, step 108, step 110, step 112, and step 115 in the foregoing embodiment.

In another example, the communication apparatus is the first backhaul node or the chip used in the first backhaul node. The transceiver unit 101 is configured to support the communication apparatus in performing step 103 in the foregoing embodiment. The processing unit 102 is configured to support the communication apparatus in performing step 104 in the foregoing embodiment.

In an optional implementation, the transceiver unit 101 is further configured to support the communication apparatus in performing step 109 and step 111 in the foregoing embodiment.

In another example, the communication apparatus is the second device or the chip used in the second device. The transceiver unit 101 is configured to support the communication apparatus in performing step 106 in the foregoing embodiment. The processing unit 102 is configured to support the communication apparatus in performing step 107 in the foregoing embodiment.

In an optional implementation, the transceiver unit 101 is further configured to support the communication apparatus in performing step 113 and step 114 in the foregoing embodiment.

Optionally, the communication apparatus may further include a storage unit 103. The processing unit 102, the transceiver unit 101, and the storage unit 103 are connected by using a communication bus.

The storage unit 103 may include one or more memories. The memory may be a component configured to store a program or data in one or more devices or circuits.

The storage unit 103 may exist independently, and is connected to the processing unit 102 of the communication apparatus by using the communication bus. The storage unit 103 may alternatively be integrated with the processing unit.

The communication apparatus may be used in a communication device, a circuit, a hardware component, or a chip.

For example, the communication apparatus may be the chip in the first device, the chip in the second device, or the chip in the first backhaul node in the embodiments of this application. In this case, the transceiver unit 101 may be an input or output interface, a pin, a circuit, or the like. Optionally, the storage unit 103 may store computer-executable instructions of the method on the first device side, the second device side, or the first backhaul node side, so that the processing unit 102 performs the method on the first device side, the second device side, or the first backhaul node side in the foregoing embodiment. The storage unit 103 may be a register, a cache, a RAM, or the like, and the storage unit 103 may be integrated together with the processing unit 102. The storage unit 103 may be a ROM or another type of static storage device that can store static information and instructions, and the storage unit 103 may be independent of the processing unit 102.

An embodiment of this application provides a communication apparatus. The communication apparatus includes one or more modules, configured to implement the method in step 101 to step 115. The one or more modules may correspond to the steps of the method in step 101 to step 115. Specifically, in this embodiment of this application, for each step in the method performed by the first device, the first device includes a unit or a module for performing each step in the method. For each step in the method performed by the second device, the second device includes a unit or module for performing each step in the method. For each step in the method performed by the first backhaul node, the first backhaul node includes a unit or module for performing each step in the method.

Figure 18:
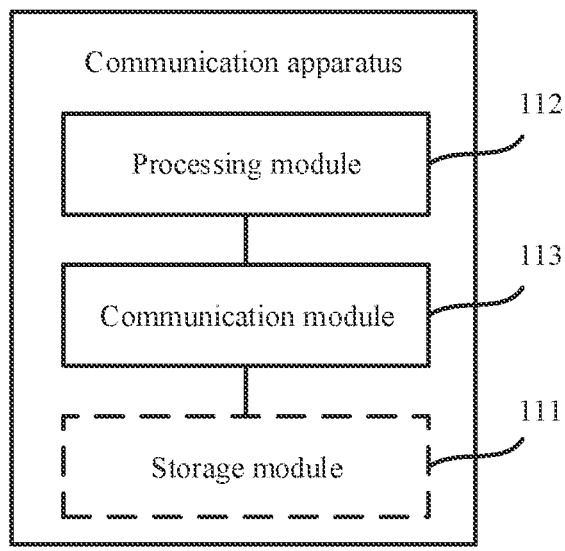
FIG. 18 is a schematic structural diagram 3 of a communication apparatus according to an embodiment of this application.

For example, when an integrated unit is used, FIG. 18 is a possible schematic diagram of a logical structure of a communication apparatus in the foregoing embodiment. The communication apparatus may be the first device, the second device, the first backhaul node, the chip used in the first device, the chip in the second device, or the chip in the first backhaul node in the foregoing embodiment. The communication apparatus includes a processing module 112 and a communication module 113. The processing module 112 is configured to: control and manage an action of the communication apparatus. The communication module 113 is configured to perform a step of processing a message or data on the communication apparatus side.

Optionally, the communication apparatus may further include a storage module 111, configured to store program code and data that are of the communication apparatus.

For example, the communication apparatus is the first device or the chip used in the first device. The communication module 113 is configured to support the communication apparatus in performing step 102 in the foregoing embodiment. The processing module 112 is configured to support the communication apparatus in performing step 101 in the foregoing embodiment.

In an optional implementation, the communication module 113 is further configured to support the communication apparatus in performing step 105, step 108, step 110, step 112, and step 115 in the foregoing embodiment.

In another example, the communication apparatus may be the first backhaul node or the chip used in the first backhaul node. The communication module 113 is configured to support the communication apparatus in performing step 103 in the foregoing embodiment. The processing module 112 is configured to support the communication apparatus in performing step 104 in the foregoing embodiment.

In an optional implementation, the communication module 113 is further configured to support the communication apparatus in performing step 109 and step 111 in the foregoing embodiment.

In another example, the communication apparatus is the second device or the chip used in the second device. The communication module 113 is configured to support the communication apparatus in performing step 106 in the foregoing embodiment. The processing module 112 is configured to support the communication apparatus in performing step 107 in the foregoing embodiment.

In an optional implementation, the communication module 113 is further configured to support the communication apparatus in performing step 113 and step 114 in the foregoing embodiment.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processing module 112 may implement or execute various examples of logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communication module 113 may be a communication interface, a transceiver, a transceiver circuit, an interface circuit, or the like. The storage module 111 may be a memory.

When the processing module 112 is the processor 41 or the processor 45, the communication module 113 is the transceiver 43, and the storage module 111 is the memory 42, the communication apparatus in this application may be the communication device shown in FIG. 6.

Figure 19:
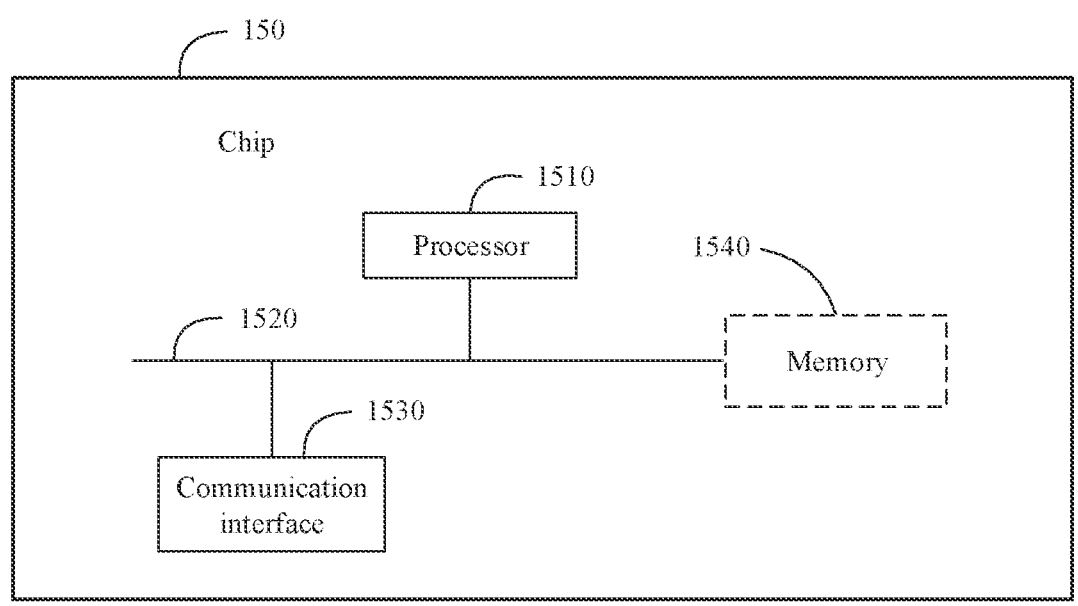
FIG. 19 is a schematic structural diagram of a chip according to an embodiment of this application.

FIG. 19 is a schematic structural diagram of a chip 150 according to an embodiment of the present invention. The chip 150 includes one or more (including two) processors 1510 and a communication interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, or a subset thereof, or an extended set thereof.

In this embodiment of the present invention, a corresponding operation is performed by invoking the operation instructions stored in the memory 1540 (where the operation instructions may be stored in an operating system).

In a possible implementation, the chips used in the first device, the second device, and the first backhaul node have similar structures, and different apparatuses may use different chips to implement respective functions.

The processor 1510 controls an operation of the first device, the second device, or the first backhaul node, and the processor 1510 may also be referred to as a central processing unit (CPU). The memory 1540 may include a read-only memory and a random access memory, and provide instructions and data for the processor 1510. A part of the memory 1540 may further include a non-volatile random access memory (NVRAM). For example, in application, the memory 1540, the communication interface 1530, and the memory 1540 are coupled together by using a bus system 1520. The bus system 1520 may include a power bus, a control bus, a status signal bus, and the like in addition to a data bus. However, for clear description, various types of buses in FIG. 19 are marked as the bus system 1520.

The foregoing transceiver unit may be an interface circuit or a communication interface of the apparatus, and is configured to receive a signal from another apparatus. For example, when the apparatus is implemented as a chip, the transceiver unit is an interface circuit or a communication interface that is of the chip and that is configured to receive a signal from another chip or apparatus or send a signal.

The method disclosed in the foregoing embodiments of the present invention may be used in the processor 1510, or implemented by the processor 1510. The processor 1510 may be an integrated circuit chip, and has a signal processing capability. In an implementation process, the steps in the foregoing methods may be implemented by using a hardware integrated logical circuit in the processor 1510, or by using instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. The steps of the methods disclosed with reference to the embodiments of the present invention may be directly performed by a hardware decoding processor, or may be performed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communication interface 1530 is configured to perform receiving and sending steps of the first device, the second device, and the first backhaul node in the embodiments shown in FIG. 7 to FIG. 17. The processor 1510 is configured to perform processing steps of the first device, the second device, and the first backhaul node in the embodiments shown in FIG. 7 to FIG. 17.

In the foregoing embodiments, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

An embodiment of this application further provides a computer-readable storage medium. All or some of the methods described in the embodiments may be implemented by using software, hardware, firmware, or any combination thereof. If the methods are implemented in software, functions used as one or more instructions or code may be stored in or transmitted on the computer-readable medium. The computer-readable medium may include a computer storage medium and a communication medium, and may further include any medium that can transfer a computer program from one place to another. The storage medium may be any target medium that can be accessed by a computer.

In an optional design, the computer-readable medium may include a RAM, a ROM, an EEPROM, a CD-ROM or another optical disc storage, a magnetic disk storage or another magnetic storage device, or any other medium that is used to carry or store required program code in a form of instructions or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL or the wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. All or some of the methods described in the embodiments may be implemented by using software, hardware, firmware, or any combination thereof. When the methods are implemented in software, all or some of the methods may be implemented in a form of a computer program product. The computer program product includes one or more computer instructions. When the foregoing computer program instructions are loaded and executed on a computer, the procedures or functions described in the foregoing method embodiments are all or partially generated. The computer may be a general-purpose computer, a dedicated computer, a computer network, a base station, a terminal, or another programmable apparatus.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A method, comprising:
   determining, by a first device, to manage a first radio link control (RLC) bearer on a wireless backhaul link between a first backhaul node and a second device, wherein the second device is a parent node of the first backhaul node, and wherein:
   the first device is a centralized unit (CU) of a donor base station, and the second device is a distributed unit (DU) of the donor base station;
   the second device is a second backhaul node, and the first device is the donor base station; or
   the first device is the CU, and the second device is the second backhaul node;
   sending, by the first device, a backhaul type indicator and management information of the first RLC bearer to the first backhaul node, wherein the backhaul type indicator is used to indicate that a type of the first RLC bearer is a backhaul type, and the management information of the first RLC bearer is used to determine a radio bearer of a terminal mapped to the first RLC bearer or the management information of the first RLC bearer is used to determine an RLC bearer or a logical channel between the first backhaul node and a child node of the first backhaul node mapped to the first RLC bearer;
   sending, by the first device, the backhaul type indicator and the management information of the first RLC bearer to the second device; and
   in response to sending the backhaul type indicator and the management information of the first RLC bearer to the second device, receiving, by the first device from the second device, an identifier of a logical channel corresponding to the first RLC bearer or identification information of the first RLC bearer.

2. The method according to claim 1, wherein the first device is the CU, the second device is the DU, and the management information of the first RLC bearer comprises:
description information of a traffic flow that is mapped to the first RLC bearer, wherein the description information comprises any one or more of the following information at an IP layer that is peered to the CU and the DU: differentiated services code point (DSCP) information or a flow label.

3. The method according to claim 1, wherein determining, by the first device, to manage the RLC bearer on the wireless backhaul link between the first backhaul node and the second device comprises:
when managing the radio bearer of the terminal, determining, by the first device, to manage the first RLC bearer on the wireless backhaul link between the first backhaul node and the second device; or
when the first backhaul node accesses the first device, determining, by the first device, to manage the first RLC bearer on the wireless backhaul link between the first backhaul node and the second device.

4. The method according to claim 3, wherein there is also a default radio bearer, between the first backhaul node and the second device, used to transmit traffic of the first backhaul node, and wherein the method further comprises:
sending, by the first device to at least one of the first backhaul node or the second device, indication information used to indicate that the first RLC bearer is the default radio bearer.

5. The method according to claim 3, wherein the second device is the second backhaul node, and wherein the method further comprises:
sending, by the first device to the second device, identification information of a third RLC bearer that is mapped to the first RLC bearer or an identifier of a logical channel corresponding to the third RLC bearer, wherein the third RLC bearer is an RLC bearer on a wireless backhaul link between the second backhaul node and a fourth device, and wherein the fourth device is a parent node of the second device.

6. The method according to claim 1, wherein the backhaul type indicator and the management information of the first RLC bearer are sent in a same message.

7. The method according to claim 1, wherein an RLC entity corresponding to the first RLC bearer is associated with an upper-layer Adapt layer entity.

8. The method according to claim 1, wherein receiving, by the first device from the second device, the identifier of the logical channel corresponding to the first RLC bearer or the identification information of the first RLC bearer comprises:
receiving, by the first device from the second device, the identifier of the logical channel corresponding to the first RLC bearer.

9. A first device, comprising:
at least one processor; and
at least one memory storing instructions for execution by the at least one processor to cause the first device to perform operations comprising:
determining to manage a first radio link control (RLC) bearer on a wireless backhaul link between a first backhaul node and a second device, wherein the second device is a parent node of the first backhaul node, and wherein:
the first device is a centralized unit (CU) of a donor base station, and the second device is a distributed unit (DU) of the donor base station;

the second device is a second backhaul node, and the first device is the donor base station; or
the first device is the CU, and the second device is the second backhaul node;
sending a backhaul type indicator and management information of the first RLC bearer to the first backhaul node, wherein the backhaul type indicator is used to indicate that a type of the first RLC bearer is a backhaul type, and the management information of the first RLC bearer is used to determine a radio bearer of a terminal mapped to the first RLC bearer or the management information of the first RLC bearer is used to determine an RLC bearer or a logical channel between the first backhaul node and a child node of the first backhaul node mapped to the first RLC bearer;
sending the backhaul type indicator and the management information of the first RLC bearer to the second device; and
in response to sending the backhaul type indicator and the management information of the first RLC bearer to the second device, receiving, from the second device, an identifier of a logical channel corresponding to the first RLC bearer or identification information of the first RLC bearer.

10. The first device according to claim 9, wherein the first device is the CU, the second device is the DU, and the management information of the first RLC bearer comprises:
description information of a traffic flow that is mapped to the first RLC bearer, wherein the description information comprises any one or more of the following information at an IP layer that is peered to the CU and the DU: differentiated services code point (DSCP) information or a flow label.

11. The first device according to claim 9, wherein determining to manage the RLC bearer on the wireless backhaul link between the first backhaul node and the second device comprises:
when managing the radio bearer of the terminal, determining to manage the first RLC bearer on the wireless backhaul link between the first backhaul node and the second device; or
when the first backhaul node accesses the first device, determining to manage the first RLC bearer on the wireless backhaul link between the first backhaul node and the second device.

12. The first device according to claim 11, wherein there is also a default radio bearer, between the first backhaul node and the second device, used to transmit traffic of the first backhaul node, and wherein the operations further comprise:
sending, to at least one of the first backhaul node or the second device, indication information used to indicate that the first RLC bearer is the default radio bearer.

13. The first device according to claim 11, wherein the second device is the second backhaul node, and wherein the operations further comprise:
sending, to the second device, identification information of a third RLC bearer that is mapped to the first RLC bearer or an identifier of a logical channel corresponding to the third RLC bearer, wherein the third RLC bearer is an RLC bearer on a wireless backhaul link between the second backhaul node and a fourth device, and wherein the fourth device is a parent node of the second device.

14. The first device according to claim 9, wherein receiving, from the second device, the identifier of the logical channel corresponding to the first RLC bearer or the identification information of the first RLC bearer comprises:
receiving, from the second device, the identifier of the logical channel corresponding to the first RLC bearer.

* * * * *